Dec. 26, 1950 A. P. DANK 2,535,486

MAGNETIC RECORD TRANSDUCING APPARATUS HAVING A BACKING ELEMENT FOR COUPLING A RECORD TAPE TO THE MAGNETIC HEAD

Filed Aug. 16, 1946 6 Sheets-Sheet 1

INVENTOR
A. P. DANK
BY Pineles & Greene
ATTORNEYS

Dec. 26, 1950 A. P. DANK 2,535,486

MAGNETIC RECORD TRANSDUCING APPARATUS HAVING A BACKING ELEMENT FOR COUPLING A RECORD TAPE TO THE MAGNETIC HEAD

Filed Aug. 16, 1946 6 Sheets-Sheet 2

INVENTOR.
A. P. DANK
BY
Pineles & Greene
ATTORNEYS

Dec. 26, 1950 A. P. DANK 2,535,486
MAGNETIC RECORD TRANSDUCING APPARATUS HAVING A BACKING ELEMENT FOR COUPLING A RECORD TAPE TO THE MAGNETIC HEAD
Filed Aug. 16, 1946 6 Sheets-Sheet 3
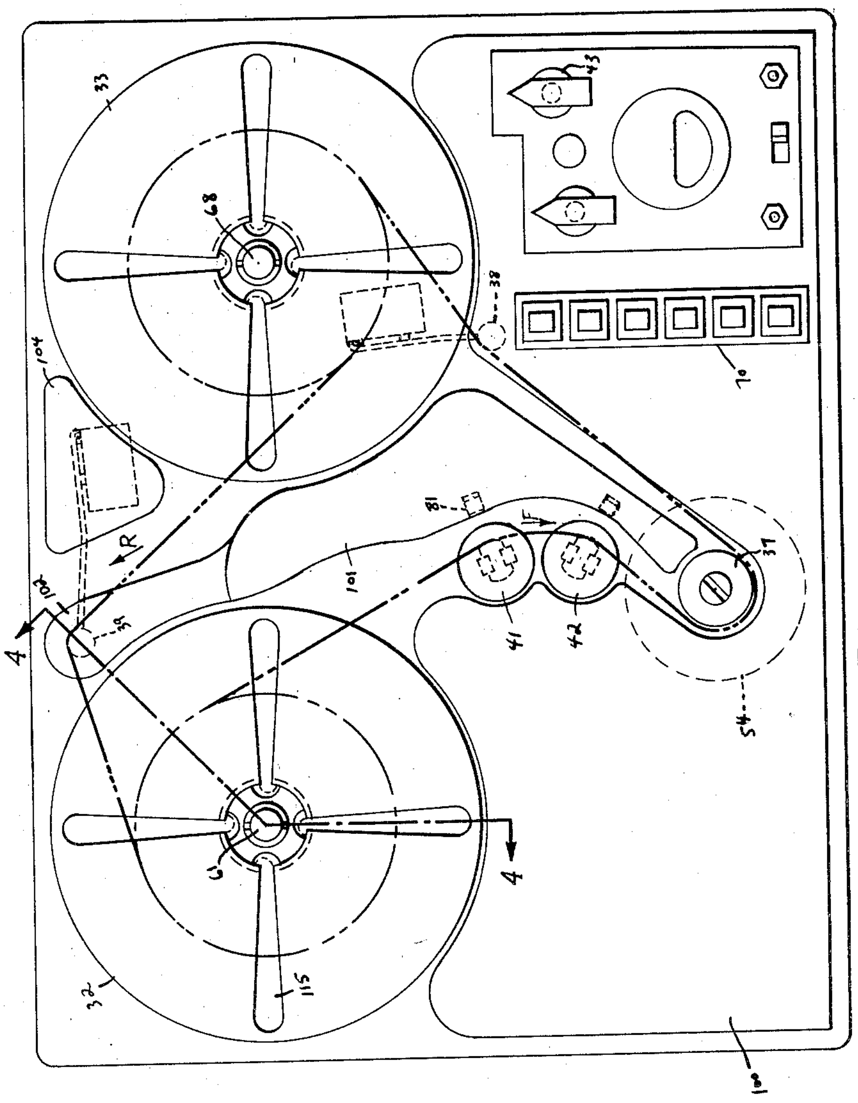
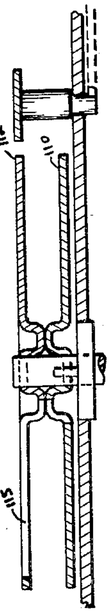
Fig. 4
Fig. 3
INVENTOR.
A. P. DANK
BY
Pinckes + Greene
ATTORNEYS Dec. 26, 1950

A. P. DANK 2,535,486

MAGNETIC RECORD TRANSDUCING APPARATUS HAVING A BACKING ELEMENT FOR COUPLING A RECORD TAPE TO THE MAGNETIC HEAD

Filed Aug. 16, 1946

6 Sheets-Sheet 4

INVENTOR
A.P. DANK
BY Pineles & Greene
ATTORNEYS

Dec. 26, 1950 A. P. DANK 2,535,486

MAGNETIC RECORD TRANSDUCING APPARATUS HAVING A BACKING ELEMENT FOR COUPLING A RECORD TAPE TO THE MAGNETIC HEAD

Filed Aug. 16, 1946 6 Sheets-Sheet 5

INVENTOR.
A. P. DANK
BY
Pineles & Greene
ATTORNEYS

INVENTOR
A. P. DANK
BY Pineles & Greene
ATTORNEYS

Patented Dec. 26, 1950 2,535,486

UNITED STATES PATENT OFFICE 2,535,486

MAGNETIC RECORD TRANSDUCING APPARATUS HAVING A BACKING ELEMENT FOR COUPLING A RECORD TAPE TO THE MAGNETIC HEAD

Alfred P. Dank, Euclid, Ohio, assignor to The Brush Development Company, Cleveland, Ohio, a corporation of Ohio Application August 16, 1946, Serial No. 690,878

30 Claims. (Cl. 179—100.2)

This invention relates to magnetic recording and reproducing apparatus and more particularly to such apparatus utilizing as a magnetic recording medium a thin flexible magnetic record member or track, such as a tape or filament which may be stored on reels, although in some of its aspects the invention is not limited to such recording medium.

Among the objects of the invention are novel magnetic recording devices of the foregoing type embodying various features which make them foolproof and simple in operation, and which eliminate difficulties heretofore encountered with such devices.

The foregoing and other objects of the invention will be best understood from the following description of exemplifications thereof, reference being had to the accompanying drawings wherein:

Fig. 3 is a top view of a recording apparatus according to the invention;

Fig. 4 is a cross-section of the apparatus of Fig. 3 along the broken line 4—4.

In the copending applications of Otto Kornei, Serial No. 685,092, filed July 20, 1946, and Serial No. 685,093, filed July 20, 1946 (the latter application has been abandoned), there is described a novel magnetic recording and reproducing system and method utilizing as a magnetic recording medium a stratum of bonding compound having substantially uniformly dispersed therein permanently magnetizable powder particles and forming a thin flexible tape- or filament-like magnetic record track and cooperating with a magnetic record transducer head, the pole faces of which are aligned along one side of the surface of the stratum and capable of recording magnetic signals with a signal-to-noise ratio of the order of about 50 db., while the recording medium moves only at a relatively very low speed, such as eight inches per second.

The magnetic recording apparatus of the present invention provides a novel reeling mechanism for such recording system which makes it possible to produce high quality magnetic records on such thin, flexible, although mechanically weak, magnetic recording media with a relatively high degree of fidelity, while assuring that the mechanical forces to which the thin, flexible and relatively-weak magnetic recording media are subjected during the reeling operation, are at all times kept so low as to practically eliminate breakage of the recording medium not only when it is reeled at a slow speed during a recording or playback operation, but also while it is reeled at an extremely high speed during a rewinding operation or when it is desired to reel it in forward direction at a high speed.

Figure 1:
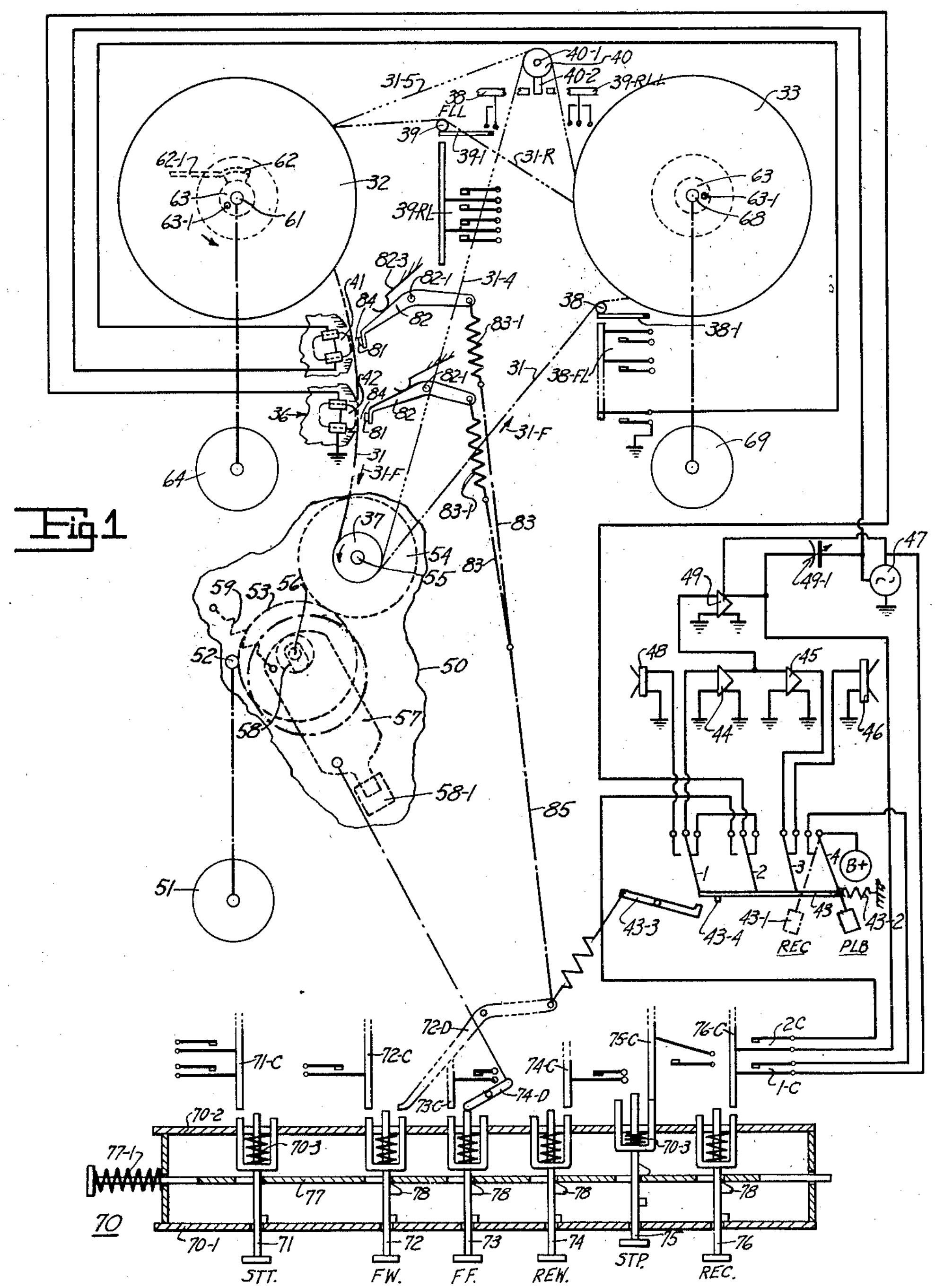
Fig. 1 is a simplified diagrammatic view illustrating the general relationship of the mechanical and electric elements of a mechanically simple form of magnetic recording and reproducing apparatus exemplifying the invention.
Figure 2:
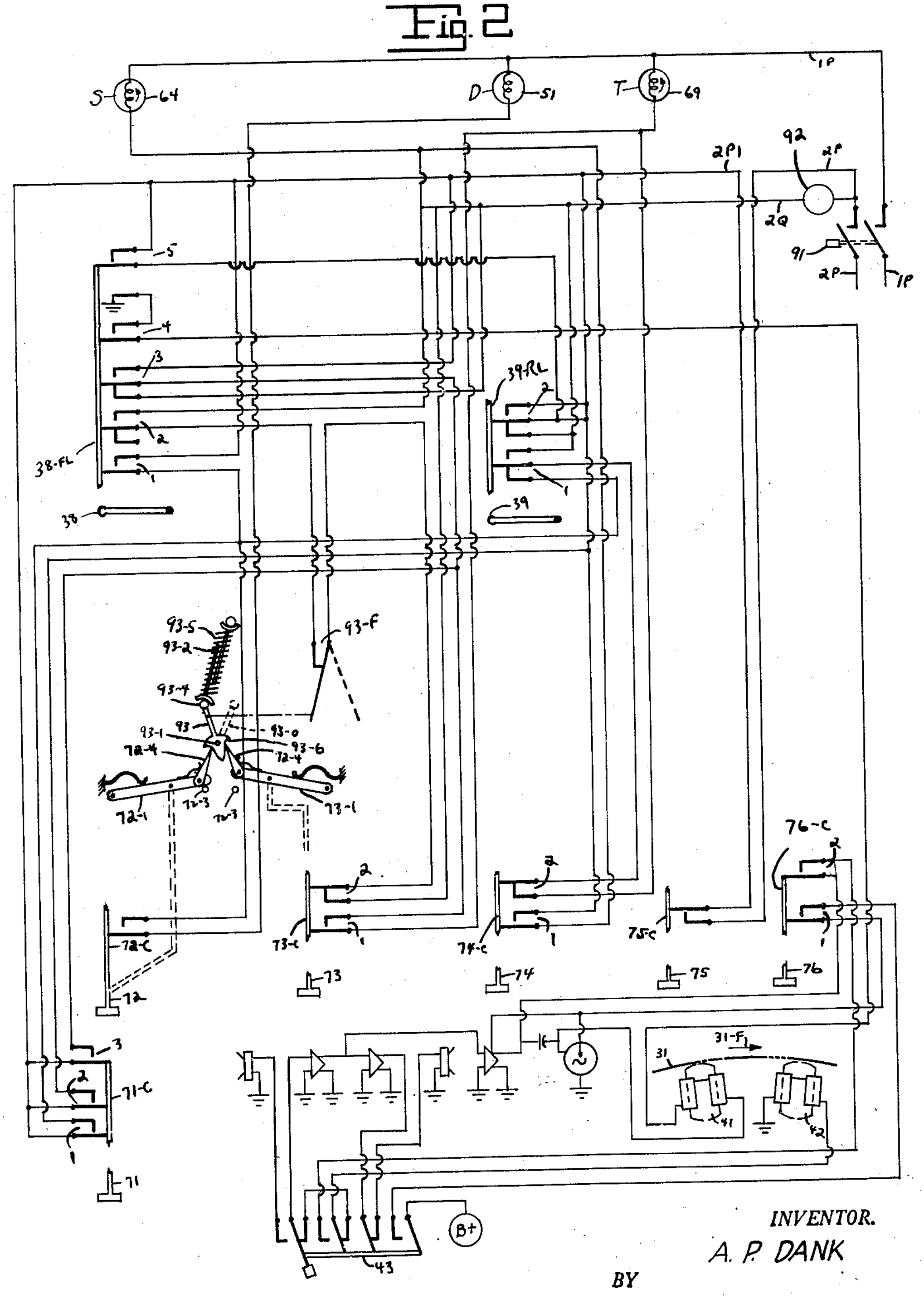
Fig. 2 is a simplified circuit diagram of the elements of the reversible drive and of the drive control of the magnetic recording and reproducing device of Fig. 1.

Figs. 1 and 2 illustrate in a simplified diagrammatic manner the general relationship of the mechanical, magnetic and electric elements of a mechanically-simple form of a magnetic recording and reproducing apparatus of the invention designed specifically for use in connection with a recording medium formed of a thin limp elongated record member, such as a tape made of paper or a plastic or synthetic resin compound, provided at least one exposed surface with a layer of permanently magnetizable powder dispersed in a bonding compound forming part of the recording medium.

However, various features of the invention disclosed herein are applicable to other magnetic recording media, such as in the form of thin filaments, of fibre or filament forming linear polymers, or threads of silk, embodying or coated with a layer of magnetizable particles. Some of the features of the invention are also applicable to magnetic recording media formed of metallic ferro-magnetic tapes, filaments and wires.

In Figs. 1 and 2 the magnetic recording medium is indicated by dash-double-dot line 31, and is arranged to be reeled from supply reel 32 onto take-up reel 33. The supply reel 32 and the take-up reel 33 are mounted on reel shafts 61 and 66, respectively, which are driven by reel drive mechanism so that during the recording and the playback process the recording medium 31 is impelled in the direction of the arrow 31—F, and reeled from supply reel 32 onto the take-up reel 33. In order to play back the recorded program or to make a new record on the recording medium, it must be rewound or reeled from take-up reel 33 onto supply reel 32.

To simplify the description of the features of the invention, a slow speed reeling operation in the direction of the arrow 31—F, during which a new record is made on the recording medium or a previously made record is played back, will be designated a forward reeling operation, reel 32 will be designated the supply reel and reel 33, the take-up reel. In addition, the fast rewinding operation during which the recording medium is reeled back from the takeup reel 33 on the supply reel 32 will be designated as the rewind operation, and a fast reeling operation in the forward direction indicated by the arrow 31—F, in order to quickly reach a desired point on the recording medium for playing back a record sequence made thereon or for replacing it with another record sequence, will be designated as the fast forward reeling operation.

In the particular form of recording apparatus shown, the take-up reel is driven in counter-clockwise direction during a forward reeling operation, and the supply reel 32 is similarly driven in counter-clockwise direction as indicated by the arrow during the rewinding operation. The reels 32, 33 are similar to those used for standard amateur-type motion picture reels. Thus, in the case of a recording medium formed of a thin tape one-quarter of an inch wide, each reel may be made with an inner reel core 1⅜ inches in diameter so that a reel seven inches in diameter is sufficient for storing a length of the recording medium required to make a record of one-half hour duration.

During the recording or playback process the recording medium 31 is guided from the supply reel 32 past a record transducer head structure 36, along a forward drive path indicated by arrow 31—F, so as to couplingly engage the periphery of a capstan-like roller 37 and pass therefrom along the guide surface of a forward limit control member 38 to the take-up reel 33. During the rewinding process, the recording medium 31 may be guided along the same path just described, as it is reeled from the take-up reel 33 onto the supply reel 32. However, it is simpler to remove the record tape 31 from the capstan roller and carry on the rewinding process by guiding the tape 31 directly back from the take-up reel 33 onto the supply reel 32, along the fast reeling or rewind path indicated by the dash-triple-dot line 31—R, the tape being guided along the guide surface of a rewind limit control element 39. This fast reeling path 31—R may also be utilized whenever it is desired to reel the record member fast in forward direction on the take-up reel, for instance, in order to quickly reach a desired portion of a long record.

The two limit control members 38, 39 are combined with limit switches 38—FL, 39—RL which are actuated from the non-operated position shown to an operated position when the respective limit control member 38, 39 is operated by the recording medium 31.

The magnetic head structure 36 is not part of the present invention and may be of the type described in the copending application of Otto Kornei, Serial No. 688,034, filed August 2, 1946, Patent No. 2,523,576, which issued on September 26, 1950. The transducer head structure 36 shown has an erasing head 41 and a record transducing head 42 each provided with windings and a magnetic core structure which has pole pieces separated by a non-magnetic gap along which the recording medium is moving in the direction of the arrow 31—F during a magnetic recording or playback process.

During the magnetic recording process, each element of the recording medium 31 passes successively first past the gap region of the erasing head 41 and then past the gap region of the recording head 42. The recording system shown in Fig. 1 is arranged to carry on magnetic recording and reproducing operations under the control of a multi-blade recording switch 43 which controls the electric circuit connections of the recording head structure with the amplifier and signal pickup and reproducing devices of the system, additional control means, generally designated 70, serving to provide for the proper operation of the driving mechanism during the recording, playback and other reeling operations.

The recording switch 43 is a standard multi-blade switch shown operated manually by a knob between the full-line right-hand playback position shown and the left-hand dotted-line recording position 43—1. The drive control unit 70 is indicated in Fig. 1 diagrammatically as a conventional push-button type selector control arrangement provided with a series of button-operated push rods 71, 72, 73, 74, 75, 76, also designated by the legends STRT for start, FW for forward, FF for fast forward, REW for rewind, STP for stop, and REC for record.

In such conventional push-rod selector control mechanism, a slidably mounted latch bar 77, which is biased to a latching position as by a spring 77—1, is arranged to retain in an inward operative position one or more of the previously actuated push rods, such as push rod 75 shown latched in the inward position, the latch bar 77 being actuated to release the latched push rod whenever it is actuated in lateral direction against the biasing action of spring 77—1 by a cam surface of a latch projection 78 shown provided on the push rods 72 to 76 which are to be latched when selectively actuated to an inward position.

The latch bar and the mounting structure elements 70—1, 70—2 of the push-rod mechanism are provided with suitable slits through which the several push rods are arranged to be slidably movable between the inward operative position and the released outward position to which they are biased by the springs 70—3 encircling a prong portion of each push rod. The substantially rigid frame structure of such push-rod mechanism may be also utilized to support sets of control switches 71—C, 72—C, 73—C, 74—C, 75—C, 76—C as indicated in Figs. 1 and 2 so that whenever any one of the push rods 71 to 76 is pushed to the inward operated position, it will actuate its switch to the operated position.

It will be noted that the push rod 71 of the starting switch rod is not provided with a latch projection 78 so that when it is actuated to the inward operated position, it and its switch 71—C are automatically returned to the non-operated position. Furthermore, since the push rod 71 of the starting switch does not have a latch projection 78, it does not release any of the other push rods from an inward operated position to which they have been actuated before actuation of the starting switch push rod 71.

In addition, as indicated diagrammatically in Fig. 1, the framework of the push-rod mechanism 70 has mounted thereon mechanical elements, such as pivotally mounted levers 72—D and 74—D which are arranged so that whenever the respective push rods 72, 74 are actuated to the inward operated position, the respective levers 72—D, 74—D are actuated from the non-operated position shown to an operated position for performing a desired mechanical control operation, as explained hereinafter. Although the push-rod selector control arrangement is shown in Fig. 1 for controlling the operation of the switches and mechanical control elements of the reeling mechanism, other types of analogous control arrangements may be used, for instance, a rotary type selector control arrangement movable to a plurality of different angular positions and provided with cam elements for selectively actuating the different switches and the different mechanical control elements in the different settings of the rotary control member.

With the control arrangement of Fig. 1 as shown, a record recorded on the recording medium 31 will be played back when the main recording switch 43 is in the full-line position shown while the recording track 31 is reeled on the take-up reel 33. In such play-back condition, the recording switch 43 establishes the following playback circuits:

Contacts 1 and 2 of the recording switch 43 connect the lead from the windings of the recording head 42 which now operates as a playback head to the input side of a pre-amplifier 44, the output of which is impressed on an additional playback amplifier 45, the output side of which is connected through switch blade 3 of the recording switch 43 in its playback position to the reproducing device shown in the form of a loudspeaker 46.

In order to make a new record on a portion of the moving recording medium 31 when the switches 72—C and 76—C are operated by the push-button rods 72, 76 in the manner explained hereinafter, the recording switch 43 has to be thrown to the left-hand dotted-line position 43—1 in which it establishes in connection with the other operated switches of the device the following recording circuit:

Contact blade 4 of the recording switch 43 in its left-hand position, in conjunction with contact 1C of push rod switch 76—C, connects a source of high frequency oscillations, such as an oscillator 47 to a source of positive electric power supply indicated by (B+). The oscillator circuit as well as the other analogous circuits described hereinafter, are shown completed by conventionally indicated ground connections to which are also connected the negative terminals of all D. C. supply sources. High frequency oscillator 47 is shown connected directly to the windings of the erasing head 41, the energizing circuit of which is completed by contacts 1C of the forward limit switch 38—FL when it is held in the operated condition by the moving recording medium, in the manner explained hereinafter.

The high frequency erasing current supplied by the oscillator 47 to the windings of the erasing head 41 is of sufficiently large amplitude so that each element of the thin magnetic recording medium 31 passing the gap region of the erasing head 41 is subjected to an alternating flux strong enough to erase any previous magnetic signal records impressed on the moving magnetic recording medium 31 and restore the magnetic elements thereof to a magnetically neutral condition.

After being subjected to the magnetic erasing action by the erasing head, each element of the moving recording medium 31, upon reaching the gap region of the recording head 42, is subjected to the combined action of a magnetic recording flux produced by the amplified signal currents that are to be recorded and the superposed high frequency biasing flux component. In Fig. 1, a conventionally shown microphone 48 serves as a source of signals which are to be recorded, and blade 1 of the recording switch 43 in its left-hand recording position connects the microphone 48 to the input side of the pre-amplifier 44, the output of which is impressed on an additional recording amplifier stage 49, the output of which is supplied to the windings of the recording head 42 by a circuit including the operated contacts 2C of the push rod switch 76—C and the contacts of the contact blade 2 of the recording switch 43 in the left-hand recording position, the circuit being completed by the ground connections shown.

The high frequency bias component of the recording flux is produced in the recording head 42 by a high frequency current component derived from the oscillator 47 through an adjustable coupling condenser 49—1, the high frequency component of the current being mixed with the amplified output of the recording amplifier 49 and supplied to the windings of the recording head 42 through the previously described circuit connection. Coupling condenser 49—1 and the other circuit elements of the system are designed and adjusted to mix a suitable component of the high frequency oscillations produced by the oscillator 47 with the amplified signal current supplied by the signal source, such as microphone 48 in such manner as to produce in the non-magnetic gap region of the recording head 42 the desired combination of signal recording flux and the superposed high frequency biasing flux component.

In general, when recording signals of the audible frequency range, good results are obtained by using a high frequency biasing flux of about 25 to 30 kilocycles per second, and the same source of high-frequency oscillations may be used in supplying the relatively large high-frequency erasing current to the erasing head 41, as well as the relatively small high-frequency biasing component to the recording head 42.

As indicated in Figs. 1 and 2, the additional amplifier 49 may be arranged to be supplied with its anode potential through the same circuit which supplies the positive B potential to the oscillator 47, so that the recording amplifier 49 is rendered operative only when the recording switch 43 is in the left-hand recording position.

According to the invention, the driving elements which impart driving forces to the recording medium 31 and cause it to be reeled from one reel to the other are interconnected to the elements which impel the reels by yieldable coupling means which subject the thin flexible recording medium at all times only to very limited forces just sufficient to take up its slack, but insufficient to maintain stable contact conditions between the pole faces of the recording and erasing heads 42, 41 and the elements of the recording medium moving past it. In accordance with the invention, the yieldable coupling means may be formed either by a magnetic flux fluid drive or by other fluid drives which are similar in their driving action to that exerted by a magnet on a sheet of metal, such as copper, in which the magnet induces a current when they move relatively to each other. This method of driving has not only properties of smoothness and adjustability, but also provides a damping action which suppresses forces tending to impart flutter to the portion of the recording medium which is impelled past the record transducing head.

Fig. 1 indicates diagrammatically one simple form of a driving arrangement based on the principles of the invention. During the recording or playback operation or during the normal forward reeling operation, the recording medium 31 is impelled at a constant speed past the two heads 41, 42 through its engagement with the capstan roller 37 forming part of constant speed impelling means. The constant speed impelling means include an electric motor 51 having a shaft 52 which is coupled through a rubber-tired floating coupling pulley 53 to the rim of a fly-wheel member 54 to which the constant speed impelling roller or capstan 37 is connected, the capstan roller 37 and the fly wheel 54 having a common shaft 55 serving as their revolving support.

In order to prevent the recording medium, such as the tape or filament 31, withdrawn from the supply reel 32 from becoming slack, and in order to assure that it moves at all times under a small limited force, a shaft 61 on which the supply reel 32 is mounted is subjected to a limited braking action exerted, for instance, by a braking pad 62 supported by a resilient brake arm 62—1 and engaging the surface of a collar or disc 63 affixed to the shaft 61 and which is shown serving as the coupling seat on which the supply reel 32 is seated.

In the specific drive arrangement shown, the shaft 61 forms a revolving part of an electric motor 64 suitably supported on the frame structure of the reeling mechanism underneath a mounting panel so as to expose through a hole in the top of the panel the seating member 63 of the shaft. The seating member or collar 63 affixed to the shaft just below its upwardly projecting end may be provided with an upwardly projecting coupling or key pin 63—1 arranged to interfit with a coupling notch extending from the central hole formed on the hub of each reel 32, 33 so as to establish a coupling connection between the shaft 61 and a reel, such as reel 32, seated on the seating collar 63. Alternatively, each reel support shaft may be provided with a transversely extending key arranged to interfit with coupling notches extending from the central hole formed in the hub of the reel.

In one commercial form of a recording mechanism of the type shown in Fig. 1, each of the reels 32, 33 are designed to revolve around a vertical axis. With such reel arrangement, the two reels may be coupled to their respective reel drive shafts by providing a frictional coupling connection between a collar member, such as collar 63, of sufficiently wide diameter having an upwardly facing friction surface designed so that when a reel is seated on the shaft end, the weight of the reel will establish a frictional coupling connection with the facing friction material layer of the underlying coupling roller 63.

Reel 33 is similarly supported on a similar seating disc 63 of another reel drive shaft 68 which in the arrangement shown in Fig. 1 forms a revolving part of another electric motor 69 supported underneath the top panel in the same manner as the elements of the motor 64 which serves as a revolvable support for the reel 32. Through the medium of the three electric motors 51, 64, 69, the driving shaft of the supply reel 32 and the take-up reel 33 are intercoupled with the drive mechanism including motor 51 of the constant speed normal forward drive capstan 37, thereby assuring that there is at all times available a magnetic flux or generally a fluid coupling medium as a coupling interconnection between the several mechanical elements of the driving mechanism through which forces are applied to the recording medium, such as the tape 31, as it is being impelled at a low speed, such as eight inches per second, on the take-up reel during a forward record transducing operation.

As indicated in Fig. 1, the capstan roller 37 with its fly wheel 54 may be mounted to revolve on the shaft 55 which is held affixed to a mounting plate 50 which is secured, for instance, through a plurality of spacer rods, not shown, to the underside of the panel wall along which the reels and the other exposed elements of the driving mechanism are located in exposed positions. The motor 51 is suitably affixed to the underside of the mounting plate 50 so that the exposed upper shaft end of the motor shaft 52 projects through a hole in the mounting plate and faces a peripheral portion of the rubber-tired coupling pulley 53 through which the shaft is coupled to the metallic periphery of the fly wheel 54. The floating coupling pulley 53 is mounted in a manner similar to the conventional mountings of the floating coupling pulleys in phonograph drives.

As indicated in Fig. 1, the coupling pulley 53 is rotatably mounted on a shaft post 56 held affixed to a plate-like slider member 57. The slider plate 57 is slidingly interconnected in a conventional way with apertures 58, 58—1 of the motor mounting plate 50 and is biased, as by a tension spring 59, connected between a fixed portion of the slider 57 and a fixed portion of the mounting plate 50, so as to maintain the rubber tire of the coupling pulley 53 in coupling engagement with the motor shaft 52 and the fly wheel 54 for transmitting thereto and to the capstan 37 a rotary motion which causes the capstan roller 37 to impart to the recording medium or tape 31 the required flutter-free low constant speed, the rubber-tired coupling pulley with the fly wheel 54 serving as a filter for filtering out any non-uniformities of the motion transmitted by the motor 51.

In a commercial embodiment of the driving mechanism of the invention shown in Fig. 1, the three motors 51, 64, 69 are standard high-speed induction motors of the type commonly used in small turntable drives. In this driving arrangement, the shafts of the two motors 64, 69 form revolvable supports for the two reels 32, 33 and the bearings of the two motors 64, 69 serve as journalling supports for the shafts 61, 68 of the two reels.

The surface of the capstan roller 37 is provided with a surface layer of friction material, such as Corprene or felt. When the magnetic recording medium 31 is made in the form of a tape of non-magnetic material, such as paper or plastic or resin material, an impelling or capstan roller 37, ⅞ of an inch in diameter, will establish a good coupling driving engagement with such tape for driving it at a constant speed if the tape encircles about ⅓ or more of the periphery of such impelling roller. As shown in Fig. 1 of the drawing, a record track engagement with only about one-half of the periphery of the impeller roller provides suitable constant speed driving engagement with substantially no slippage.

As explained before, the driving arrangement for the recording medium is so designed as to assure that when the magnetic recording medium, such as the flexible thin tape 31 of limited strength is impelled along the normal forward path 31—F at a slow speed by the driving forces imparted thereto by the capstan roller 37, the portion of the tape moving from the supply reel 32 past the erasing and recording heads 41, 42 to its position of engagement with the capstan roller 37 is subjected to such small tension forces that they are insufficient by themselves to maintain stable coupling engagement between the pole faces of the two magnetic heads 41, 42 and the facing portions of the moving tape 31 bridging the pole gaps of the two heads.

In accordance with the invention, stable contact conditions between the pole faces of each magnetic head 41, 42 and the portions of the moving recording medium 31 bridging the pole gap are assured notwithstanding the limited small tension forces to which the moving recording medium is subjected, by placing in front of the pole gap of each of the two magnetic heads 41, 42 a holder or pressure pad 81 arranged so that when a recording or playback operation is carried on the holder pad 81 engages the exterior side of the tape and maintains or presses the inwardly facing side of the tape along which the magnetic recording medium is exposed into positive contact engagement with the pole faces of each magnetic head bridging the pole gap region to assure stable flux interlinkage between the windings of each magnetic head and the magnetic particles of the recording medium bridging the gap.

As indicated in Fig. 1, each of the holder pads 81 is mounted on a separate lever arm 82 pivotally mounted at 82—1 and subjected to a biasing action as by a spring 82—3 so that when each lever is subjected to actuating forces exerted thereon by links 83, respectively, the two levers are actuated to bring their respective holder pads 81 into engagement with the outwardly facing side of the portions of the moving tape 31 facing the pole faces of the two magnetic heads 41, 42 to assure positive and stable contact engagement between the pole faces of the two heads and the magnetic particles of the moving recording medium, notwithstanding the small tension forces to which the moving recording medium is subjected.

As indicated in Fig. 1, each of the holder pads 81 is normally held by the biasing means 82—3 away from the facing pole faces of their respective magnetic heads 41, 42 so as to leave open a substantial channel space 84 between each pad and the facing magnetic head for enabling ready placing or threading the tape or, in general, the recording medium 31 along the path of the normal forward reeling motion 31—F as well as ready removal or unthreading of the tape, In other words, under normal conditions when no normal forward reeling operation is carried on, the entire forward reeling path 31—F along which the recording medium or tape is guided from the supply reel past the transducer heads and the capstan roller 37 to the take-up reel is open and forms a free, relatively-wide channel into which the tape may be placed or from which it may be removed. However, as indicated diagrammatically in Fig. 1, each time the drive control mechanism is actuated to bring into action a normal forward reeling operation by actuating, for instance, the forward push rod 72 to the inward position, it will operate the lever 72—D to exert through a link 85 connecting it to the two links leading from the two pad levers 82 associated with the two magnetic heads, for causing the two pads 81 to be brought to their operated position in which each pad holds a portion of the tape in positive stable coupling engagement with the facing portion of the respective magnetic heads 41, 42.

Foolproof operation of this mechanism is made possible by interposing in each of the two links 83 through which the control lever 72—D is connected to the two pad operating levers 82 a spring 83—1 so designed that when the two links 83 are actuated by the actuation of the control lever 72—D to the operated position, the two springs 83—1 will be subjected to sufficient tension for overcoming the biasing forces exerted by the two biasing springs 82—3 associated with each pad lever and cause the two levers 82 to be operated for bringing their respective pressure pads 81 into the proper contact engagement position in which they hold portions of the tape in positive stable engagement with the facing pole faces of the two magnetic heads.

In a practical form of recording mechanism of the type shown diagrammatically in Fig. 1, each end of the recording medium 31 made in the form of a thin flexible tape of the type described above is connected to the inner core or drum 34 of each reel by inserting the end of the tape into an axial slit formed in the reel core wall and then turning the reel until one convolution of the tape retains the inserted tape end in its position on the exterior of the core, at least one side wall of each reel being provided with a generally radial opening or slit so as to make it possible to grip the end of the tape brought against the open periphery of the reel and place the gripped end of the tape in the slit of the reel core 34.

When carrying on reeling operations with such reel and tape arrangement, the end of the tape will automatically be pulled out from the reel from which it is unreeled when the full length of the tape has been transferred to the reel on which it is reeled.

In accordance with one phase of the invention, the reel drive mechanism is so designed as to assure that the driving forces for impelling the tape from one reel to the other are applied thereto, and the drive motor used for supplying the impelling forces is energized only after the motion of the tape has been initially started by momentary operation of a starting control element so as to subject the portion of the tape moving toward the reel on which it is reeled to an initial tensioning force sufficient to move a limit control member, such as limit members 38, 39 from the non-operated positions in which they are shown to an operated position in which they perform a control action establishing the reel impelling conditions under which the motor and the drive connections are maintained to continue the reeling operation until either the drive control arrangement has been stopped by the actuation of a stop control member or until the whole length of the recording medium or tape has been transported from one reel to the other.

In a practical form of reeling mechanism of the type shown diagrammatically in Fig. 1, the two limit control members 38, 39 are made in the form of elongated guide members either as a smooth rod or a small-diameter roller mounted on a roller shaft, the limit members 38 or 39 being carried on the free end of an arm 38—1, 39—1, respectively, pivotally mounted so that the forces exerted by the moving recording medium or tape 31 on the limit members 38, 39 as it moves thereover will tilt the limit arm from a non-operated to an operated position for operating limit control means indicated in Fig. 1 by the two limit control switches 38—FL and 39—RL, respectively.

One form of selective reeling control arrangement utilizing the push rod mechanism 70 of the type described in connection with Fig. 1, or analogous forms of such selective control mechanisms will now be described by reference to the circuit diagram of Fig. 2. As shown in Fig. 2, the capstan or constant speed drive motor 51, the supply reel motor 64 and the take-up reel motor 69 are arranged to be energized by electric energy from a conventional alternating-current domestic supply source indicated by supply line conductors 1—P, 2—P, respectively, a switch 91 providing a connection between the power supply leads and the circuits through which the drive control arrangement controls the energization of the several motors. There is further shown a supply line conductor 2—Q which is connected through a relatively high impedance rectifier 92 to the supply line conductor 2—P for making it possible to selectively supply the windings of the reel shaft motors 64, 69 with a D. C. current of a predetermined magnitude in accordance with the principles of the invention described hereinafter.

Fig. 2 shows also the portions of the several push-button rods 71, 72, 73, 74, 75, 76 and a set of switches 71—C, 72—C, 73—C, 74—C, 75—C, 76—C which are actuated to the operated position when the respective push rods are actuated to the inward operated position in the manner described before in connection with the push-rod control mechanism 70 of Fig. 1. There are also shown portions of the two limit control members 38, 39 with the forward limit switch 38—FL and the rewind limit switch 39—RL which are operated to the operated position each time the respective limit control member 38, 39 has been actuated from the released position to a flexed operated position by the tension applied by the moving tape to the respective limit control members 38, 39.

In the circuit diagram of Fig. 2, it is assumed that the reeling mechanism is at stand still, the stop switch 75—C being shown in the operated position held by the stop push rod 75 which is retained in the operated position in the manner indicated in Fig. 1. In this operating condition of the control mechanism, all other push rods 71 to 74 and 76 will be in the released position shown in Fig. 1 and their respective associated switches 71—C, 72—C, 73—C, 74—C and 76—C will be in the released position as shown in Fig. 2. Furthermore, since in this standstill condition of the mechanism the recording medium or tape 31 is not moving, it will not be subjected to any tension and, as a result, both limit switches 38—FL and 39—RL will be in the released condition in which they are shown in Fig. 2.

It should be noted that the recording device of the type shown in Fig. 1 may be arranged so as to make it possible to reel the recording medium in forward direction on to the take-up reel 33 at the same fast rate as during the rewinding operation, by providing a limit member 40 in the form of a roller revolvably mounted on a fixed shaft 40—1 and placed so that when the recording medium 31 is led from one reel to the other either along the slow forward patch indicated by the dash-four-dot line 31—4 or by way of the fast rewind or forward path indicated by the dash-five-dot line 31—5, a sufficient peripheral region of the roller 40 will be engaged by the moving tape or recording medium 31 as to frictionally rotate the roller 40 and cause a projecting arm 40—2 of the roller 40 to actuate either a forward limit switch 38—FLL or a rewind limit switch 39—RLL from the normal non-operated position to a flexed operated position in a manner analogous to that described before in connection with the forward limit switch 38—FL and rewind limit switch 39—RL.

When using such limit control means or limit switch arrangement, the two limit control members 38, 39 with their associated limit switch are omitted and replaced by the limit control member 40 with the associated limit switches 39—RLL, 38—FLL. These limit switches as well as all other switches of the control arrangement 70 are of the spring-blade type which return, when released, to the non-operated position in which they are shown in Fig. 1, except for the operated stop switch 75—C which is held by the locked push rod 75 in the operated position.

To facilitate the threading of the tape along the normal forward record transducing path 31—F, it is desirable to subject the tape to a very limited small restrain as it is being pulled from the supply reel 32 and placed along the forward guide path 31—F between the channels 84 in front of each of the recording heads 41, 42 and then around the capstan 37 and over the forward limit member 38, and the tape end placed in the retainer slit of the take-up reel 33. Such limited restrain may be applied by applying a limited braking force to the reel shaft 61 of the supply reel. In Fig. 1, such braking force is shown applied by the brake pad 62 engaging the seating collar of the reel shaft 61 described above. However, in lieu of mechanical braking means 62, such limited braking force may be applied to either reel shaft 61 or reel shaft 68, if desired, by supplying to the windings of the two motors 64, 69 a small direct component whenever the recording mechanism is in the standby position, with the stop push rod 75 in the inner operated position in which it is shown in Fig. 1 corresponding to the operated position of its associated stop switch 75—C.

Fig. 2 also shows a portion of the recording medium or tape 31 moving in the normal forward direction 31—F past the erasing head 41 and the record transducing head 42 as well as the recording control switch 43 and the recording and playback circuits which are controlled by the operation of the recording playback switch 43, in combination with certain contactor elements of the switches operated by the push rod 76 and the normal forward limit switch 38—FL.

Other features of the recording and drive control arrangement of the invention will now be described in connection with the following description of its operation:

When the stop push rod 75 is in its inward operated position in which it is shown in Figs. 1 and 2, the drive mechanism of the recorder is in a standby position and the recording medium 31 will be at standstill. In this condition, the reels 32, 33 may be removed from their coupling engagement with their respective reel shafts or replaced thereon. Furthermore, in this standby condition, the tape may be threaded along the forward path 31—F for a slow forward drive recording or playback operation indicated by the dash-double-dot line. In such standby condition, the recording medium may be also removed from its slow forward path 31—F and placed either on the fast rewind path 31—R or 31—5 or in the fast forward path 31—4 or returned from any one of these paths back to the slow forward path 31—F or the like.

When the stop rod 75 is in its inward position, it actuates the associated stop switch 75—C to open the energizing circuit leading from the supply line conductor 2—P to the continuation thereof 2—P1 through which the individual motors 51, 64, 69 may be selectively energized, one terminal of each of these motor windings being connected to the supply line conductor 1—P of opposite polarity. The stop switch 75—C may be provided with two additional similar contacts for connecting the rectified D. C. supply line 2—Q through suitable current limiting resistors to the windings of the supply reel and the take-up reel motors so as to subject them to a very slight braking action to facilitate the threading of the tape in the manner explained above. However, for the sake of simplicity, these obvious circuit connections have been omitted from Fig. 2.

*Slow forward operation*

Assuming that the recording medium or tape 31 is threaded along the slow forward path 31—F, a playback operation for playing back a previously made record or a recording operation may be initiated at any time after first actuating the slow forward push rod 72 and its associated switch 72—C to their inward, or operated positions. The actuation of the slow forward push rod 72 to the operated position releases the stop rod 75 to the non-operated position, thereby causing its push rod switch 75—C to close its contacts and connect the motor energizing line 2—P1 to the energy supply lead 2—P. As shown in Fig. 1, the slow forward push rod in its inward operated position actuates the control lever 72—D to the operated position in which it transmits through links 85 and 83 actuating forces to the two pad levers 82, thereby bringing their pads 81 into a position in which they maintain the portions of the recording medium or tape 31 facing the pole gap region of the two magnetic heads 41, 42 in stable contact engagement with the pole faces of the magnetic heads.

In its inward operated position, the slow forward push rod 72 actuates its push rod switch 72—C to establish the following motor energizing circuits provided the forward limit switch 38—FL has likewise been actuated from the release position in which they are shown in Fig. 2 to the operated position:

In its inward flexed position, the slow forward push rod switch 72—C closes an energizing circuit for the constant speed drive motor 51, this motor energizing circuit being completed by the contact 1 of the forward limit switch 38—FL when it is in its operated position. In addition, the operated contact of the forward push rod 72 completes a circuit for the motor 69 of the take-up reel by way of the non-operated contacts 2 of the rewind switch 74—C and the non-operated contacts 1 of the rewind limit switch 39—RL which complete the motor energizing connection to the motor supply lead 2—P1.

It should be noted that actuation of the forward push rod 72 and the associated slow forward switch 72—C to the operated position does not by itself complete the circuit required to energize the constant speed drive motor 51 and the take-up reel drive motor 69, because the forward limit switch 38 was released during the previous standstill condition since the tape or recording medium 31 was not tensioned and permitted the biasing action of the contact springs of the forward limit switch 38—FL to return the contact springs to the non-operated position in which contacts 1 open the energizing circuit to the two motors leading from the disconnectable power supply lead 2—P1. However, when the slow forward push rod 72 and its associated switch 72—C have been actuated to the inward operated position, it is merely necessary to momentarily actuate the start switch 71—C for momentarily completing at its contacts 1 a circuit which shunts or bypasses the still open contacts 1 of the forward limit switch 38, so that the two motors 51, 69 are instantaneously energized and start the reeling operation as soon as the starting switch 71 has been actuated to the operated position, whereupon, the forward limit switch 38—FL is actuated by the tensioned recording medium or tape 31 to complete and maintain the previously described circuit through which the two motors 51, 69 are energized in the manner previously described.

It should be noted that the starting switch 71—C remains closed only as long as the button of its push rod 71 is held in its inward position so that after momentary actuation of the push rod 71 it and its associated switch 71—C will automatically return to the released position in which they are shown in Figs. 1 and 2, respectively.

As will be seen from Fig. 2, the circuit through which the constant speed drive motor 51 and take-up reel drive motor 69 are energized, are controlled not only by the slow forward switch 72—C and the forward limit switch 38—FL, but also by contacts of the rewind switch 74—C and contacts of the rewind limit switch 39—RL, the purpose of this interlocked circuit control arrangement being explained hereafter.

The slow forward reel operation just described may be stopped at any moment by momentary actuation of the stop push rod 75 to the inward operated position, thereby automatically restoring the previously described standstill condition in which the operating elements of the mechanism are shown in Figs. 1 and 2. Furthermore, if substantially the full length of the recording medium 31 has been reeled on the take-up reel during the slow forward operation, the end of the tape 31, upon being released from the supply reel 32, will release the forward limit switch 38—FL from its flexed operated position and cause it to instantaneously open at its contacts 1 the energizing circuit from the disconnectable power supply lead 2—P1 to the two motors 51, 69.

*Rewind operation*

A slow rewind operation may be started at any moment during the progress of a slow forward reel operation along the path 31—F by actuating the rewind push rod 74 and its associated rewind switch 74—C to the inward operated position. However, if it is desired to effect a fast rewind operation of the recording medium, the slow forward reeling operation has to be first brought to a stop by actuating the stop rod 75 with its stop switch 75—C to the operated position in which the reeling operation is stopped.

Thereupon, the tape or recording medium 31 which is now released from any tension is removed from its position along the slow forward reeling path 31—F and placed along its fast rewind path 31—R so that a portion of the tape or recording medium 31 passes over the rewind limit member 39. Thereupon, a fast rewinding operation may be started by first actuating the rewind push rod 74 and its switch 74—C to their inward operated position and momentarily actuating the starting push rod 71 and its starting switch 71—C to the operated position.

When the rewind push rod 74 with its rewind switch 74—C are actuated to the operated flexed position, respectively, there are established the following circuits for energizing the supply reel motor 64 for carrying on a fast rewinding operation:

The operated contacts 1 of the rewind switch 74—C and the operated contacts 2 of the rewind limit switch 39—RL complete an energizing circuit from the disconnectable power supply line 2—P1 to the supply reel motor 64. In order to cause the rewind limit switch 39—RL to actuate its contacts to the operated position in which its contacts 2 complete the energizing circuit for the supply reel motor 64, it is merely necessary to momentarily actuate the starting push rod 71 and its switch 71—C to the operated position in which its contacts 2 by-pass or establish a parallel circuit around the contacts 2 of the rewind limit switch 39—RL.

During the rewinding operation, the take-up reel 33 is under no restraint and the energized supply reel motor 64 will now impart to the supply reel 32 its full speed, thereby causing the tape to be rewound at a very fast rate. In the practical recording arrangement based on the principles of the invention utilizing reels seven inches in diameter for storing a magnetic recording tape sufficient to make a record of half an hour's duration, the full length of such tape will be rewound on the supply reel 32 within about one minute by using the reeling arrangement of the invention of the type described above.

Since the recording medium or tape moves at a very high speed during such fast rewinding operation, it is important to provide safe-guards to assure that the tape or recording medium is not torn and that otherwise no damage is done. According to one phase of the invention, one such safe-guard is provided by assuring that when the full length of the tape or recording medium 31 has been reeled on the supply reel 32 during a fast rewinding operation, the reeling operation is automatically stopped and braking means are automatically applied to the shaft of the supply reel 32 on which the full length of the tape has now been rewound.

Thus, at the end of a rewinding operation, the rewind limit switch 39—RL, on being released from the operated position, will automatically return to the non-operated position while the rewind switch 74—C is still retained in the flexed operated position by its inwardly latched push rod 74. In this operating condition, a direct current is supplied from the direct current line 2—Q by way of the released contacts 2 of the rewind limit switch 39—RL and therefrom through the operated contacts 1 of the rewind switch 74—C back to the windings of the supply reel motor 64, the D. C. energizing circuit being completed through the connection of the motor windings to the power supply lead 1—P which is at all times connected thereto and which, in conjunction with the rectifier 92, supplies the required direct current to the windings of the motor 64.

Squirrel-cage induction motors are very effective braking means when the winding of such motor is supplied with D. C. Conventional squirrel-cage induction motors of the type used in turn-table drives may be readily stopped by the braking action exerted on the squirrel-cage inductor by the magnetic field interlinking the stator with the rotor of the motor when the winding of such induction motor is supplied with a direct current of about 150 milliamperes.

According to another phase of the invention, an additional safe-guard is provided in case, during the progress of a fast rewinding operation, any one of the other push rods or controls of the driving mechanism have been actuated either accidentally or deliberately, for instance, by actuating the stop push rod button 75, for stopping the fast rewinding operation by releasing the rewind push rod and its associated rewind switch 74—C to the non-operated position, by bringing about automatic application of braking forces to the shaft of the take-up reel 33 which is now rotated at a high speed as the recording medium is reeled off therefrom on to the supply reel 32.

As shown in Fig. 2, when the rewind switch 74 is released during a fast rewinding operation and opens at its contacts 1 the alternating current power supply to the supply motor 64, its released contacts 2, in conjunction with the still flexed contacts of the rewind limit switch, completes a circuit for supplying direct current from the direct current supply lead 2—Q to the take-up motor 69 for applying thereto braking forces which bring it promptly, but in a gradual manner, to a stop, as explained above, the rewind limit switch 39—RL being retained in the operated flexed position as long as the momentum of the rotating supply reel with the tape or recording medium that is being reeled thereon at a fast rate, maintain the recording medium under tension.

The safe-guards just explained are effective not only when the stop push rod 75 with its stop switch 75—C have been actuated to stop a fast rewind operation while it is progressing, but also when any one of the other push rods, such as 72, 73, 76 of the control mechanism 70 and their switches are actuated to their inward position during the progress of a fast rewinding operation, thereby releasing the rewind push rod 74 and its switch to the non-operated position.

*Fast forward*

Since the reel of a recording mechanism of the type described above is capable of storing a record of long duration, it is frequently desired to perform a fast forward reeling operation for reaching a particular portion of the record previously made on the recording medium. With the recording arrangement shown in Fig. 1, a fast forward reeling operation may be carried on by first leading the tape passing from one reel to the other along the path indicated by the dash-five-dot line 31—5 over the revolvably mounted roller 40 so that when the tape moves along the path 31—5, it will, through its engagement with the surface of the limit roller 40 cause its arm to operate the associated forward limit switch 38—FLL to the operated position, this switch having the same contacts and operating in the same manner as the forward limit switch 38—FL shown in Fig. 2 in connection with which such fast forward operation will be described.

To start a fast forward reeling operation, the fast forward push rod 73 and its associated switch have to be actuated to the operated or inward position, whereupon momentary actuation of the starting push rod with its starting switch 71—C will instantaneously complete the following energizing circuit for the winding of the take-up motor 69 so as to cause it to reel thereon the tape or recording medium 31 at substantially the same fast rate as the fast rewinding operation described above:

The fast rewind energizing circuit for the winding of the take-up motor 69 is established by the closed operated contacts 1 of the fast forward switch 73—C in conjunction with the operated contacts 3 of the forward limit switch 38—FL through which the winding of motor 69 is connected to the disconnectable power supply lead 2—P1, the operated contacts 3 of the starting switch 71—C establishing a by-pass or a parallel circuit around the contacts 3 of the forward limit switch 38—FL to momentarily energize the take-up reel motor 69 and start the fast reeling operation so that the now tensioned tape or recording medium 31 shall cause the forward limit switch 38—FL to be actuated to the operated position.

Because of the extremely fast forward reeling operation, the recording device must be provided with safe-guards for safe-guarding against trouble in case the rewinding operation is stopped by the completion of a fast forward reeling operation when the end of the recording medium or tape 31 is released from the supply reel 32 and the full length of the recording medium has been transferred to the take-up, and in the case when the progress of a fast rewinding operation has been stopped either by momentary actuation of the stop button or push rod 75 and its switch 75—C or by the momentary actuation of any one of the other push button rods 72, 74, 76, thereby releasing the fast forward push button rod and its switch from the operated position.

When, in the course of a fast forward reeling operation, the full length of the recording medium or tape 31 has been transferred from the supply reel 32 on to the take-up reel 33, the released forward limit switch 38—FL disconnects at its contacts 3 the disconnectable power supply line 2—P1 from the energizing circuit leading therefrom by way of the closed operated contacts 1 of the fast forward switch to the winding of the take-up reeling motor 69, and in its released condition this same contact 3 of the forward limit switch 38—FL now connects the circuit leading from the winding of motor 69 to the D. C. supply line 2—Q which now sends direct braking current to the take-up motor, thereby bringing it and the take-up reel 33 with the recording medium fully reeled thereon to a prompt but gradual and controlled stop.

On the other hand, if, during the progress of a fast forward reeling operation, either stop push rod 75 with its switch 75—C is actuated to stop the reeling operation, or if any one of the other push button rods 72, 74, 76 are actuated to the inward position, thereby releasing the fast forward switch from the operated position while the forward limit switch 38—FL is held in the operated position by the tape which is being reeled at a fast rate on the take-up reel—circuit connections are automatically established for supplying to the winding of the supply reel motor 64 a D. C. braking current, thereby bringing it to a prompt but gradual and controlled stop and thus stopping the progress of the fast reeling operation.

The braking circuit connections for the winding of the supply reel motor 64 are completed by the operated contacts 2 of the forward limit switch in conjunction with the released contacts 2 of the fast forward switch 73—C as well as by the contacts of the auxiliary switch 93—F which in this condition establish a connection between the direct current supply line 2—Q to the winding of the supply reel motor 64, the energizing circuit being completed through the other power supply line 1—P which remains connected to the motor as long as the main power switch 91 is closed. The auxiliary switch 93—F is so interlocked with the operation of the fast forward reel control elements and the slow forward control elements, namely the fast forward push button 73 with its switch 73—C and the slow forward push button 72 with its switch 72—C, as to automatically assure that the braking action is applied to the supply reel shaft or to the shaft of motor 64 only when a fast forward reeling operation is carried on.

Various means may be provided to automatically assure such interlocking relationship between the operation of the auxiliary switch 93—F and the operation of the slow forward and fast forward reeling controls. For the sake of simplicity, one form of such interlocking arrangement is shown in Fig. 2. A switch control arm 93, pivotally mounted at 93—1, which actuates the switch 93—F is movable either between the position shown in which it holds the contacts of switch 93—F closed or the dotted line position 93—0 in which switch 93—F is held open.

As shown in Fig. 2, a two-section toggle arm 93—2, the sections of which are mounted for telescopic movement relatively to each other, is connected between a fixed pivot pin 93—3 and a pin 93—4 of the switch arm 93, the two sections of the toggle arm 93—2 being biased as by an encircling compression spring 93—5 so that each time the switch arm is moved in either direction past the center position between its pivot 93—1 and the fixed toggle arm pin 93—3, the switch arm will be brought either to the full-line position in which it closes its switch 93—F or to the dotted-line position in which it opens its switch contacts.

Means are also provided to automatically actuate the switch arm 93 with its switch contacts to the position in which it opens the contacts 93—F whenever the slow forward control button and switch are actuated to the operated position, and to automatically actuate the switch arm 93 with its switch contacts 93—F to the closed position whenever the fast forward reel control means, such as the push rod 73 with its switch 73—C, are actuated to the operated position.

For the sake of simplicity, this automatic control is shown in the form of two auxiliary arms 72—1, 73—1, each held biased by a conventionally indicated spring against a stop pin 72—3, each arm having pivotally connected to its end a pawl 72—4 riding on a facing cam surface portion of the switch arm 93 so that when the respective arms 72—1, 73—1 is pivoted away from its stop pin, its pawl will engage one of the two teeth 93—6 of the switch arm so as to throw it from one position to the other.

The two levers 72—1, 73—1 are arranged to be actuated by the two push rods 72, 73 of the slow forward and fast forward reel control means in such manner that when the slow forward push rod 72 is actuated it will actuate the lever 72—1 and cause it to throw the switch lever 93 from the full-line position shown to the dotted-line position in which it opens the auxiliary switch contacts 93—F if the switch arm 93 with its contacts 93—F are not already in this open contact position.

In a similar manner, the auxiliary switch control lever 73—1 is associated with the fast forward control means or push rod 73 in such manner that in the event the switch lever 93 is in the dash-line position 93—0 in which switch 93 is open, the actuation of the push rod 73 will operate the lever 73—1 in such manner as to throw the switch arm 93 with its switch 93—F from the dash-line open position to the full-line closed position in which it is shown.

The roller limit member 40 with its associated switches 38—FLL and 39—RLL may replace both limit control members 38, 39 and their switches 38—FL, 39—RL to provide a more simplified construction. The single limit member 40 may be used for controlling either a forward or reverse reeling operation which may be either slow or fast speeds. With such arrangement the surface of the roller 40 is made smooth enough to reduce the friction against the tape so as not to unnecessarily decrease the speed of the high speed reeling operations either forward or rewind. A very smooth surface still provides enough friction so that the movement of the tape rotates the roller 40 together with projecting arm 40—2 far enough to operate the actuating members of the switches 38—FLL and 39—RLL. As shown, for a forward slow reeling operation the tape is threaded through channels 84 around the capstan roller 37 and then over control member 40 along the guide path 31—4 and onto the reel 33. Slow rewinding may take place along the same path if it is not desired to rethread the tape, the capstan roller 37 and its mechanically linked structure including the coupling roller 53 and motor 51 providing sufficient inertia and friction to hold down speed of the rewind even though the windings of motor 51 are not activated. However, to prevent any tendency for the slow rewinding operation to unduly increase in speed, the rewind push button switch 74—C may be provided with another set of contacts for activating the windings of motor 51 with a small amount of D. C. to provide a further braking force.

The slow rewind is very useful in helping to locate a desired portion of a long record inasmuch as the fast reeling operations are effected with a minimum of friction or other braking forces and proceed at extremely high speed with the motors 64 or 69 operating at substantially their maximum R. P. M. The slow rewind, of course, is also useful when it is desired to repeat a nearby portion of the recording since it is not necessary to rethread the tape.

The switches 38—FLL, 39—RLL may be identical with the illustrated switches 38—FL and 39—RL, respectively. The contacts 5 of forward limit switch 38—FL, as shown in Fig. 2, parallel the supply motor activation circuit contacts 2 of rewind limit switch 39—RL making possible the initiation of a slow rewind without operation of starting push button shaft 71 since it enables initiation of the operation of supply reel motor 64 without prior activation of reverse limit switch 39—RL. The momentary initiation of supply reel motor 64 performs the same function as momentary operation of the starting push button shaft 71 in the construction using a single limit control member 40 and the contacts 5 of switch 38—FL may be omitted from such a construction. However, in the modification using the separate forward and reverse limit members 38, 39, respectively, the contacts 5 of switch 38—FL are very useful in that they make it unnecessary to thread the tape 31 over the reverse limit member 39 to obtain a slow rewind.

It is desirable to effect a slow forward winding operation as well as a high speed winding with minimum braking forces applied by the brake pad 62. With such minimum braking forces the slow forward winding can be effected with a minimum of tensioning of and friction against the record track and the high speed winding can be effected at the highest possible speed.

A home recorder as described above is capable of making high quality records of symphonies or other desirable entertainment and of making permanent records of conferences, legal agreements, contracts, etc. under the operation of any layman having an extremely low level of mechanical information or ability. Such recordings may be preserved indefinitely and may be played back any number of times without appreciable effect on the recording. There may also be obtained at some expense commercially prepared recordings, such as musical master works, and these as well as other recordings could be irreparably lost by merely reeling through the machine for a short time with the magnetic head set for erasing or recording. It may be particularly desired to preserve such a valuable or expensive recording and to guard against accidental or inadvertent damage to the record, such as obliteration or superimposition of another recording.

The apparatus of Figs. 1 and 2 provides two safeguards against such damage. One safeguard is the push button switch arrangement 70 wherein two separate push buttons are provided, namely, the slow forward push button 72 and the record push button 76, both of which must be operated at the same time and held down in order to set the apparatus for a recording operation. These two push buttons 72 and 76 are not adjacent and are not easily or accidentally operated at the same time. Even slight differences in the time of operation will cause the later operated push button to release the earlier operated push button. Only deliberate and careful push button operation will set the apparatus for either an erasing or recording function such as would damage a recording. The push buttons 72, 76 may be biased toward their inoperative positions by springs of unequal compression so as to make it even more difficult to inadvertently push them both simultaneously to their operative position. The recording push button 76 together with switch 76—C does not control any motor circuits but it does interrupt the B+ power supply to the oscillator 47 as well as the additional recording amplifier 49, thus assuring that no erasing or superimposing signals are present. The switch 76—C also at its contact 2C opens the circuit to the recording winding so that even with the switch 43 in the record position in which it might accidentally be held no recording currents are supplied to the transducing head. Another safeguard is provided by the biasing of switch 43 in the playback position by the spring or other tension member 43—2 as shown, making it impossible to inadvertently leave the switch 43 set for recording. The pivoted latch member 43—3, illustrated as operated by the lever 72—D actuated by the inward operation of forward push button 72, engages a projection 43—4 on the switch 43 and latches the switch 43 into record position when the forward push button 72 is in its inward operating position. The switch 43 can only be retained in the record position if it is moved to this position simultaneously with or after the inward operation of forward push button 72. Attention is also called to the fact that the forward limit switch 38—FL at its contacts 4 establishes the circuit to the erasing head 41 so that erasing is impossible except when the tape is driven in a forward direction.

A top view of a practical construction for the magnetic recorder described above is shown in Fig. 3. The supply and take-up reels 32, 33, respectively, are shown as pivotally mounted on vertical shafts 61, 68. The magnetic heads 41, 42, the capstan roller 37, and the forward limit control member 38 are disposed in the region between the two reels. The cover plates 100, 101 are placed at approximately the level of the top of the reels and are shown so shaped and disposed that very little clearance is provided between the reels and the cover plates, the magnetic heads and cover plate 100, and the capstan roller and cover plate 101. The cover plate 100 also extends over the forward limit control member 38. Along the path that the tape is to be threaded to engage the magnetic heads, capstan roller and forward limit control member, a relatively wide channel is provided by suitably shaping and spacing the member plate 101. With such construction the only place that the tape can be conveniently placed is in the channels provided, which automatically insures the proper threading of the tape. The cover plate 101 covers both pads 81 when they are in retracted position so that there is no possibility of inserting the tape so as to jam against or entangle in the pads 81 or pad lever arms 82. The magnetic heads 81, 82 may be of the type described in the application of Otto Kornei, Serial No. 688,034, filed August 2, 1946, Patent No. 2,523,576, hereinbefore mentioned and may be provided with covers as indicated. These covers may be metallic and may be used as magnetic shields for the heads. A cover plate 102 is shown as placed over the rewind limit control member 39 and providing very little clearings adjacent the supply reel 32. Another cover member 104 is shown as spaced from cover member 102 to define a channel along which the tape may be threaded for rewinding. The cover member 104 is also very closely spaced against the take-up reel 33. The cover member 102 may be made integral with the cover member 101, if desired. With the above construction any unskilled person can thread the tape either for forward reeling or for rewinding without any difficulty. To further facilitate the threading arrows and legends may be placed alongside or in the proper channels as indicated. Care must be taken so that enough clearance is left between cover member 101 and both reels as well as between cover member 102 and both reels so as to permit the passage of tape therethrough. This increased clearance enables the tape to be lifted from around the capstan roller and the forward reeling channel, moved over and lowered into the rewinding channel while the tape is partially mounted on both reels.

In the lower right hand portion of Fig. 3 is diagrammatically represented the controls for the apparatus, including the push button assembly 70, the knob of switch 43, the knob of a volume control, jacks for plugging in various signal feed circuits, an "on-off" switch as well as a tuning eye for adjusting the level of the recording currents. Any other desired controls may be employed, and any other arrangement of the illustrated controls may be made.

Fig. 4 as well as Fig. 3 indicates the reel construction. Both supply and take-up reels are made of two side plates 110, 112 crimped and fastened together in the center, in the manner shown, as by welding. The upper plate 112 is provided with a series of slits 115 extending from the periphery of the crimped hub portion to adjacent the extreme edges of the plate. Where the slits 115 meet the hub, the hub is cut away, as shown, to provide access for an anchoring short length of tape. The slits 115 are made too narrow to admit a person's fingers, the tape being engaged by bringing the end between the plates 110, 112 from the extreme edges with the fingers and threading the tape up and out through the outer end of one of the slits whereupon the end of the tape projecting through and above the slit may be grasped by the fingers, led along the slit from the outside down to the base of the slit where the end of the tape may be lowered into the cutout portion of the hub. Rotation of the reel to wind one turn of the tape around the anchored tape end will firmly mount the tape for reeling either at high speed or low speed.

In a fast reeling operation the reels rotate at such high speed that the use of wide slits could easily cause someone's wandering finger to be engaged by a slit and severely injured.

Figure 5:
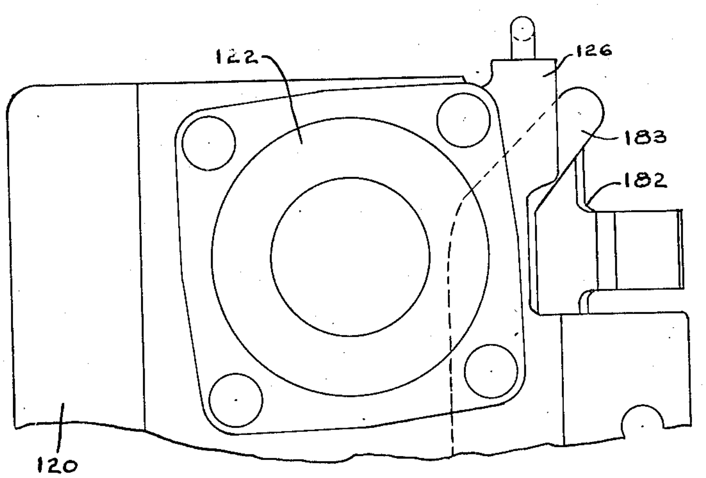
Fig. 5 is a top view of a portion of a magnetic head assembly that may be used in the recording apparatus of the invention.
Figures 6, 7:
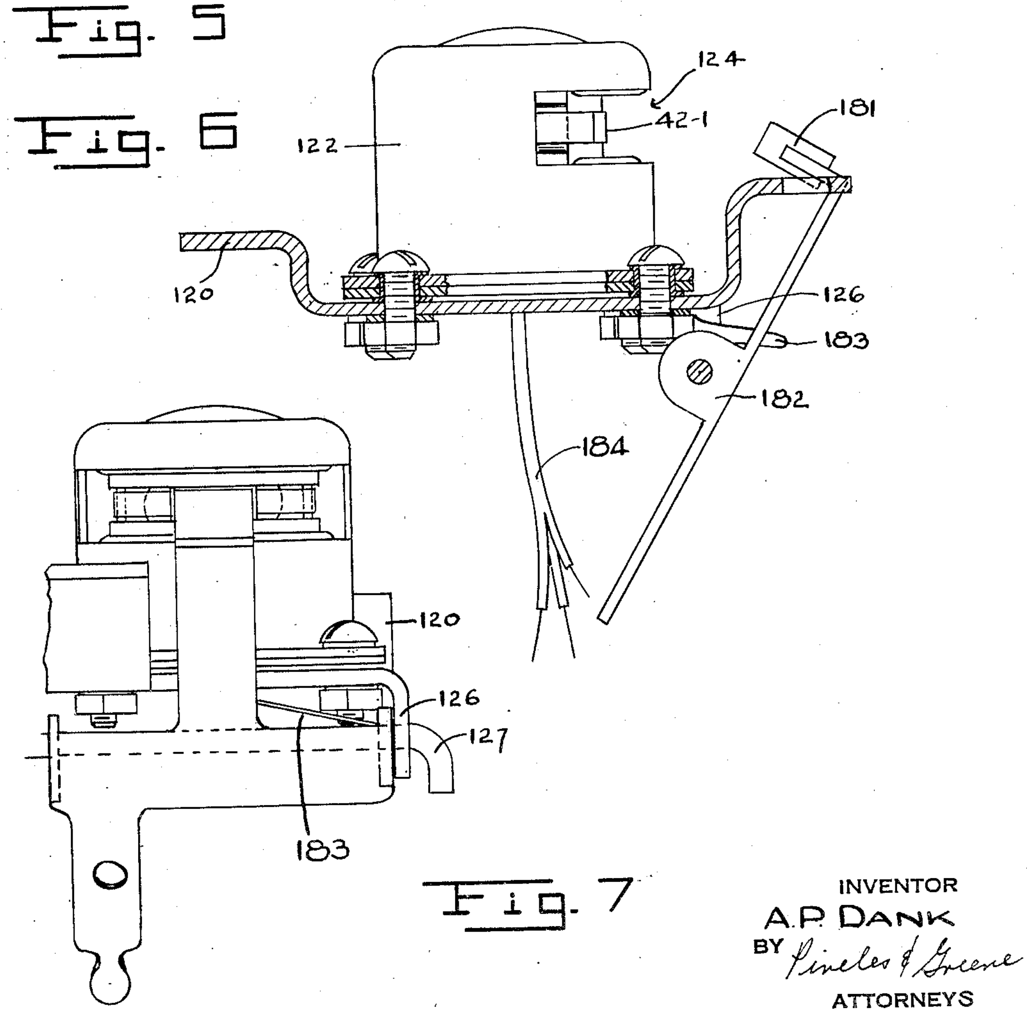
Fig. 6 is a side view of the magnetic head assembly portion of Fig. 5.
Fig. 7 is a front view of the magnetic head assembly portion of Fig. 5.

Figs. 5, 6 and 7 illustrate one form of magnetic head assembly that may be used with the apparatus described above. A lower dished-out plate member 120 has mounted on its downwardly dished portion an approximately cylindrical housing 122, the lower surface of which is flanged for the reception of mounting screws, as shown. The cylindrical housing 122 has its walls cut out at 124 to provide access to the interior in which is mounted a magnetic head. These circular magnetic heads described in the Kornei application, Serial No. 688,034, filed August 2, 1946, issued as Patent No. 2,523,576 are suitable for mounting in the cylindrical housing 122. Lugs 126 depending from the edges of plate member 120 form pivotal supports for shaft 127 on which is mounted a pair of arms 182. The arms 182 are so dimensioned that upon pivoting their upper ends will enter the cut away portion 124 of the housing 122. On the upper ends of the arms 182 are mounted the pads 181 which may be made of resilient soft material, such as felt. When actuated by the link members 83 of Fig. 1 the arms are pivoted so that the pads 181 are brought against the pole portion 42—1 of the magnetic head. Springs 183 fastened to the under surface of the plate member 120 bias the arms 182 in a clockwise direction, as is best seen in Figs. 5 and 6. Although Figs. 5, 6 and 7 show only one magnetic head mounted in a single cylindrical housing, two such heads may be mounted side by side into housing members both fastened to the same lower plate member 120. The cylindrical housing 122 as well as the plate member 120 may be metallic so as to provide magnetic shielding for the sensitive magnetic heads, apertures being provided in the plate member 120 for passage of the electrical leads 184 connected to the windings around the magnetic core. The ends of shaft 127 may be bent over, as shown in Fig. 7, to lock it in place. The entire assembly of Figs. 5, 6 and 7 may be mounted in the upper portion of the apparatus of Fig. 3, for example, the cutout portion 126 being situated at the level of the tape on the supply and take-up reels. The pads 181 in their retracted position will then be covered by the cover member 101, and the arms 182 will project below the tape channel and the upper portion of the apparatus and may be operated from below by suitable linkage with the forward push button 72.

Figures 8, 9:
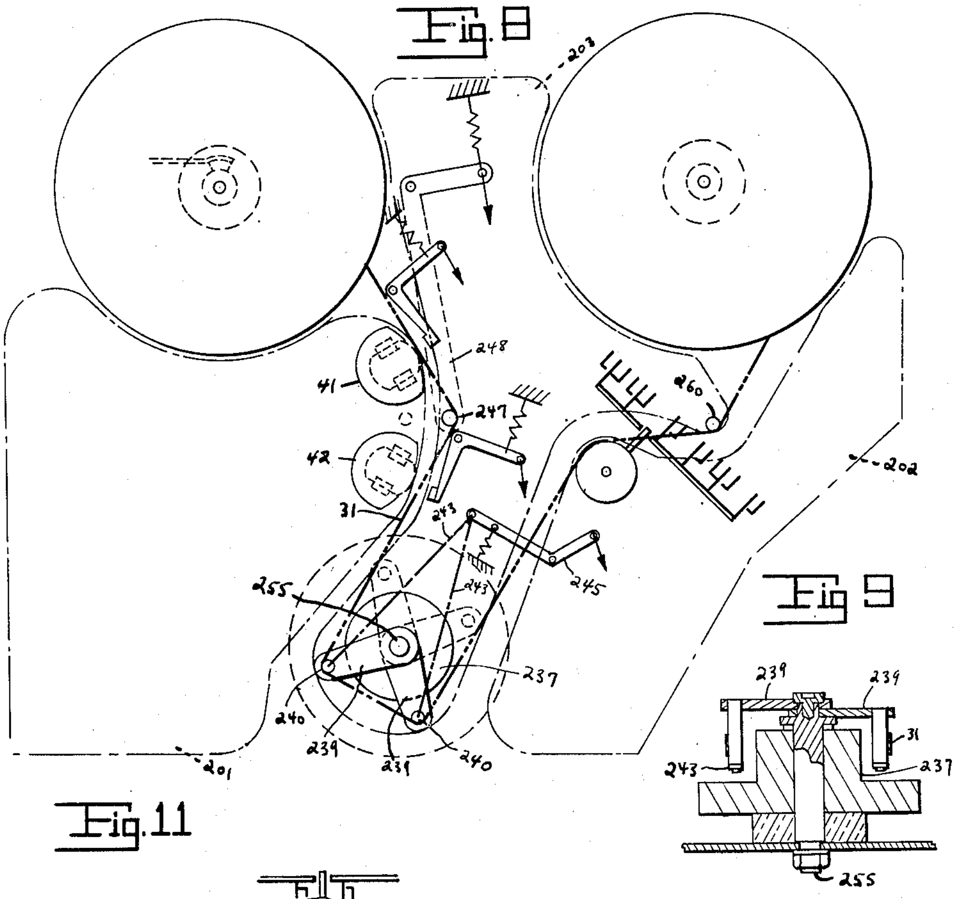
Fig. 8 is a top view similar to that of Fig. 3 of another form of recording apparatus according to the invention.
Fig. 9 is a partly sectional view of the capstan structure of Fig. 8.

In Figs. 8 and 9 is shown a construction which makes it unnecessary to move the tape through separate channels for a slow forward and fast rewind reeling operation. This construction employs a capstan roller 237 rotatably mounted on a shaft 255 on which is also rotatably mounted a pair of arms 239, each carrying a guide pin 240. Attached to the lower portion of each guide pin is a rigid link 243, as shown. Both links 243 are connected to an operating lever 245 which may be pivotally mounted. The operating lever 245 may be spring biased so as to hold the guide pins 240 in a projecting position, such as is shown in solid lines in Fig. 8, where they hold the record track 31 away from the surface of the capstan roller 237 so that a high speed reeling operation may be effected without rethreading the tape and without using a separate high speed threading channel. Operation of the operating lever 245 is adjusted to retract the guide pins 240 to the dotted line position shown in Fig. 8 where the tape 31 is not held away and is permitted to engage the capstan roller 237 so as to establish and maintain a constant slow forward reeling operation. The guide pins 240 should have a very highly burnished surface so as to effect the minimum frictional engagement of the tape to permit high speed winding without undue tensioning of the tape and to enable the use of the minimum fast reeling power. The guide pins 240 may also be pivotally mounted in their arms 239.

Another guide pin 247 may be mounted so as to project through the bottom of the channel track and may be fastened to an operating lever 248 pivotally mounted below the channel so that actuating of the operating lever 248 will cause the guide pin 247 to move in a slot transversely of the channel path. The guide pin 247 is adjusted so that when retracted into the retracted position, shown dotted in Fig. 8, the tape 31 is permitted to contact the magnetic coupling portion of each of the magnetic heads 41, 42 and when the guide pin is moved to its operating position, shown in full lines in Fig. 8, the tape 31 is held away from and does not contact either of the magnetic heads 41, 42. The operating lever 248 may also be biased to hold the pin 247 in its projecting operating position, both operating levers 245 and 248 may be connected so as to withdraw the guide pins into their retracted positions whenever the slow forward push button 72 is pushed to its inward operating position.

Alternatively, the operating levers 245 and 248 may be reversely biased so as to hold their guide pins in their retracted positions, in which case the operating levers 245, 248 may be so disposed as to be operated to project the guide pins into their operative position by inward movement of either the fast forward push button 73 or the rewind push button 74. An idler pulley 260 may be provided, as shown, to insure good contact between the moving tape 31 and the limit control member 40.

The apparatus of Figs. 8 and 9 may be used with a cover plate construction similar to that shown in Fig. 3, in which case the cover plates may be shaped to provide only a single channel used for both slow forward and high speed reeling. The cover plate should be so shaped as to overlie all the guide pins, as indicated by the dashed structures 201, 202 and 203.

Means may be provided to automatically stop a forward reeling operation before the tape is completely unwound from the supply reel 32. Such a construction makes it unnecessary to anchor the supply end of the tape after the completion of a forward reeling operation. The rewinding may then be accomplished by merely pushing the rewind push button 74 into its inward operative position if the tape is to be rewound in the same channel it is guided through for a slow forward reeling, as in Figs. 8 and 9. With the construction of Figs. 3 and 4, the fast rewinding could be accomplished by lifting the tape from the forward channel, moving it over and lowering it into the fast rewind channel followed by inward movement of the rewind push button 74. The automatic arresting of the forward reeling may be electrically accomplished by means of an electrically conductive coating near the end of the tape that is anchored to the supply reel 32. The limit control member 40 may, for example, be provided with two conductive portions in its surface spaced by a thickness of electrical insulation. A relay may be operated by the completion of the circuit through the contact surfaces of limit control member 40 and the conductive layer on the tape 31. This relay may simply be connected to operate the forward limit switch 38—FLL. The circuits should be adjusted so that the relay operation should effect the application of sufficient braking forces to the supply reel 32 to stop a fast forward reeling operation before the tape is completely unreeled.

As an alternative construction the relay operating contact surfaces may be placed on the limit control member 39, in which case the relay may be connected to operate the limit switch 38—FL and the limit control member 38 may be omitted entirely. If desired a similar relay may be used for stopping the rewind operation. These relays could obviously be modified to respond to any other physical characteristics of the tape, such as reflectivity, using photoelectric coils. When two such relays are used they may each be positioned to respond to the respective surfaces of the tape.

Figure 10:
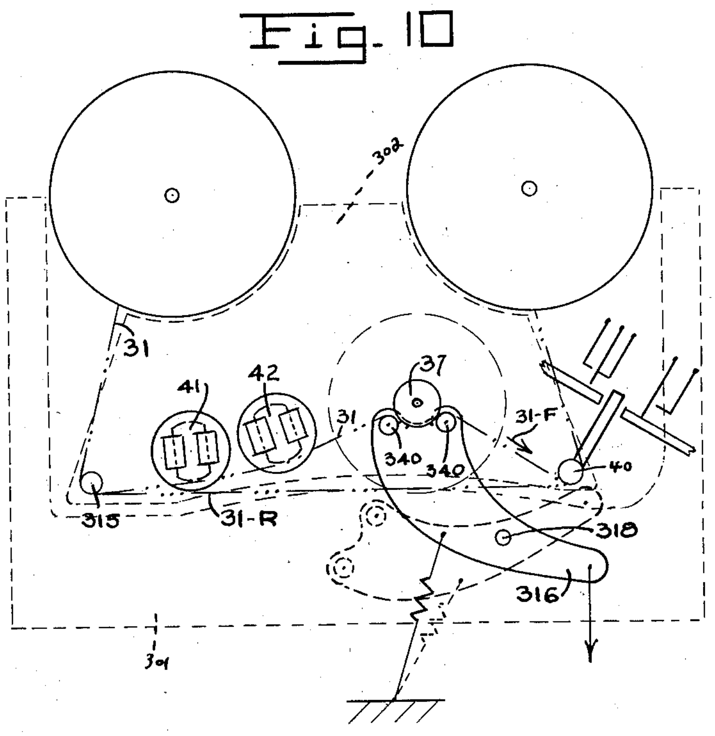
Fig. 10 is a top view similar to Fig. 3 of a further modified apparatus of the invention.

In Fig. 10 is illustrated a modified construction, similar to that of Fig. 8, in which the tape 31 moves along a forward guide path 31—F and a rewind guide path 31—R which do not require separate threading operation. The reverse guide path 31—R includes a portion between the limit control member 40 and an idler roller 315, and in this guide path portion the tape passes adjacent to but not in contact with the magnetic heads 41, 42 and the capstan roller 37. Neither magnetic head 41 or 42 is magnetically linked with the tape when the tape is in this rewind guide path 31—R. An arm 316 pivoted at 318 and having two rollers 340 mounted at one end is mounted so that when pivoted the two rollers 340 engage the tape 31 and move it from the rewind path 31—R to the forward path 31—F. In this forward path the tape now contacts the magnetically linked portions of magnetic heads 41, 42 and the tape is also pressed against the capstan roller 37 by the two rollers 340. Only one roller 340 is sufficient to establish good driving contact between the capstan roller 37 and the tape. If two rollers are used, care should be taken, as by mounting the rollers on independently swinging biased arms, to insure that both rollers automatically assume positions of proper contact engagement when the rollers are moved into their projecting activated position, shown in full lines in Fig. 10. The arm 316 may be biased into its inactive retracted position, shown in dotted lines in Fig. 10, and may be connected so as to be activated by inward motion of the slow forward push button 72. The arm 316 with its rollers may be mounted underneath a cover plate so that it is not visible and may expose the threading channel when it is in its retracted position. Cover structures similar to those of Fig. 3 may be placed on the construction of Fig. 10 as indicated by the dashed members 301 and 302.

Figure 11:
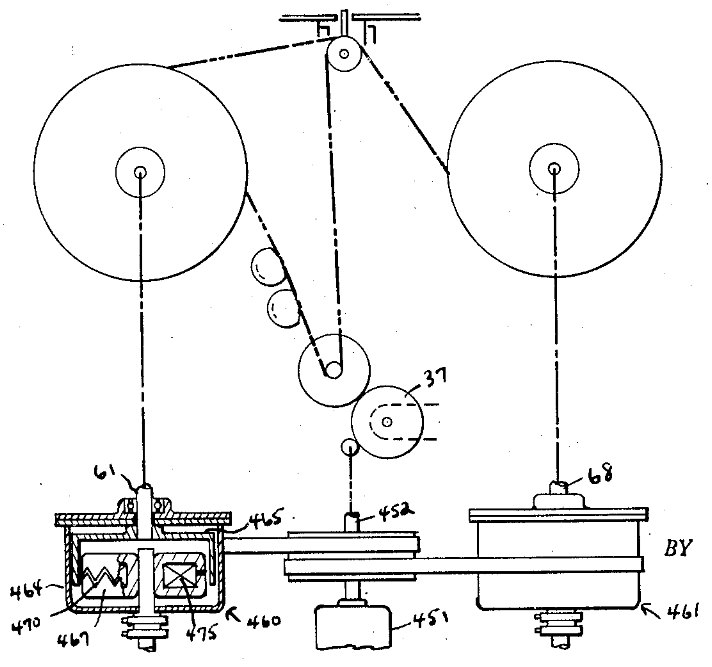
Fig. 11 is a diagrammatic representation of one modification of impelling means according to the invention, for use with a magnetic transducing apparatus.

Fig. 11 shows another modification of the invention in which only a single motor 451 is employed to impart the proper driving forces to the capstan roller 37 as well as the two reel shafts 61, 68. The motor is shown as driving the capstan roller 37 in a manner analogous to that shown in Fig. 1, two belts being used to deliver power from a pulley mounted on the shaft 452 of motor 451 to two separate clutches 460, 461. Each clutch 460, 461 comprises two independently rotatable members 464, 465, member 464 being shown as the drive member actuated by the belt, and member 465 being the driven member and being fixed on the reel shaft 61 or 68.

The clutches may desirably be magnetic clutches wherein the member 464 is secured to an internally mounted electromagnet 467 having a non-magnetic gap 470 extending around its periphery. Member 465 may be of highly conducting metal with a peripheral flange extending over and slightly spaced from the non-magnetic gap 470. A magnetizing winding 475 is provided for inducing a magnetic flux in a non-magnetic gap 470, the winding leads being connected to brush contacts, as shown.

This clutch is of the type described in the Kellogg Reissue Patent No. 19,270, dated August 14, 1934, and exerts a coupling action between the relatively rotatable members 464, 465 when these members are rotating at different speeds and when the magnetic flux as controlled by the current in the winding 475 is induced across the gap 470.

Another feature of the recording apparatus of the invention is the provision of means for substantially instantaneously stopping the slow forward reeling operation when it is desired to interrupt the recording process. Radio programs offer some of the best recording matter for home type recorders and these programs are interrupted usually with very short notice for the interjection of commercial announcements. Since the high quality of the recording would be considerably marred by the presence of these interjections it is desirable to promptly stop the recording process upon indication that a commercial announcement is to begin, and to resume the recording process when the desired portion of the program is continued.

Figure 12:
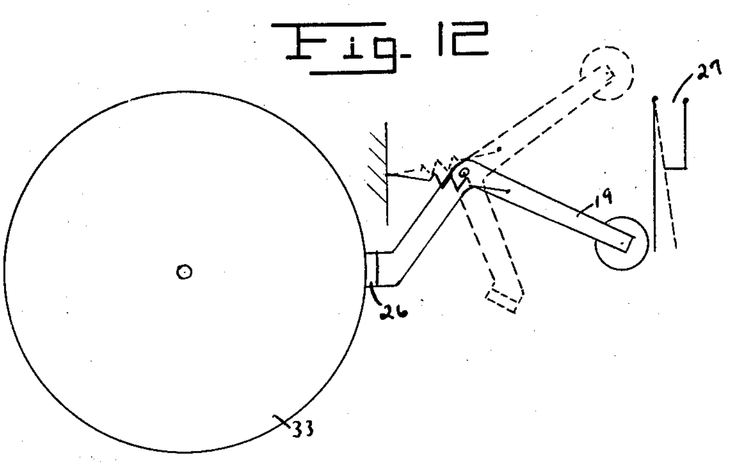
Fig. 12 is a fragmentary view of an arresting device which is used in another form of the invention.

Fig. 12 shows a portion of the apparatus which may be used for effecting such interruptions. Adjacent the periphery of the take-up reel 33 is pivotally mounted a stop lever 19 to which is affixed a braking pad 26. When the stop lever is manually operated to the braking position during a slow forward reeling operation it will immediately stop the rotation of the take-up reel 33 inasmuch as the take-up motor 69 exerts very little torque and the brake pad is applying friction at a great distance from the center of rotation. As soon as the take-up reel stops a very slight continued forward motion of the tape induced by continued rotation of the capstan roller 37 causes slack to appear in the guide path. This slack effectively removes the tape from contact with the capstan roller and stops further forward motion of the tape. The stop lever 19 may be biased so as to provide a toggle action, as shown. A switch 27 may be mounted in the path of the stop lever so that when the stop lever is retracted from its braking position it actuates the switch to close its contacts and momentarily by-pass the contacts 1 of starting switch 71—C. With this construction merely withdrawing the stop lever 19 from its braking position will start the recording process without the necessity for operating the starting push button 71. The stop lever 19 may be relay operated, if desired.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducable setting in which said impelling means impels said tape in a non-transducing manner; and operating means operative in accordance with the setting of said impelling means for causing said core and said backing element to be maintained in a transducing condition when said impelling means is in the transducing setting, and for causing said core and said backing element to be maintained in a non-transducable condition when said impelling means is in the non-transducing setting said impelling means including a revolvable drive element arranged to engage and drive a portion of said tape along said guide path at a desired transducing speed when said impelling means is in the transducing setting, said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

2. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducable setting in which said impelling means impels said tape in a non-transducing manner; said impelling means including a revolvable drive element arranged to selectively operate either in a non-transducing condition in which said drive element does not impel said tape or in a transducing condition in which said drive element impels said tape in a transducing manner when said impelling means is energized; and operating means operative in accordance with the setting of said impelling means for causing said magnetic core and said backing element and also said drive element to be maintained in a transducing condition when said impelling means is in the transducing setting, and for causing said core and said backing element and also said drive element to be maintained in a non-transducing condition when said impelling means is in the non-transducing setting.

3. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; and operating means operative in accordance with the setting of said impelling means for causing said core and said backing element to be maintained in a transducing condition when said impelling means is in the transducing setting, and for causing said core and said backing element to be maintained in a non-transducible condition when said impelling means is in the non-transducing setting said impelling means including a revolvable drive element arranged to engage and drive a portion of said tape along said guide path at a desired transducing speed when said impelling means is in the transducing setting, said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

4. In a magnetic record transducing apparatus for transducing magnetic records on successive elements of a moving tape having a relatively wide permanently magnetizable record surface on one operative side and an opposite side of the same width, the combination comprising: guide means including two reels for storing the tape and arranged to guide said tape between said reels along an elongated guide path with the operative side facing in one direction and the other side facing in an opposite direction; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; said impelling means including a revolvable drive element arranged to selectively operate either in a non-transducing condition in which said drive element does not impel said tape or in a transducing condition in which said drive element impels said tape in a transducing manner when said impelling means is energized; and operating means operative in accordance with the setting of said impelling means for causing said magnetic core and said backing element and also said drive element to be maintained in a transducing condition when said impelling means is in the transducing setting, and for causing said core and said backing element and also said drive element to be maintained in a non-transducing condition when said impelling means is in the non-transducing setting.

5. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducible setting in which said impelling means impels said tape in a non-transducing manner; said impelling means including a revolvable drive element and a cooperating coupling element mounted for relative movement between a non-transducing condition in which they are separated by an open space for receiving therebetween another portion of the tape placed along said guide path, and a transducing condition in which said drive element and said coupling element drivingly engage the opposite sides of another portion of the tape along said guide path for imparting to the tape impelling forces which impel the tape at said transducing speed when said impelling means is energized; and operating means operative in accordance with the setting of said impelling means for causing said core and said backing element and also said drive element and the cooperating coupling element to be maintained in a transducing condition when said impelling means is in the transducing setting, and for causing said core and said backing element and also said drive element and the cooperating coupling element to be maintained in a non-transducing condition when said impelling means is in the non-transducing setting.

6. In a magnetic record transducing apparatus for transducing magnetic records on successive elements of a moving tape having a relatively wide permanently magnetizable record surface on one operative side and an opposite side of the same width, the combination comprising: guide means including two reels for storing the tape and arranged to guide said tape between said reels along an elongated guide path with the operative side facing in one direction and the other side facing in an opposite direction; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; said impelling means including a revolvable drive element and a cooperating coupling element mounted for relative movement between a non-transducing condition in which they are separated by an open space for receiving therebetween another portion of the tape placed along said guide path, and a transducing condition in which said drive element and said coupling element drivingly engage the opposite sides of another portion of the tape along said guide path for imparting to the tape impelling forces which impel the tape at said transducing speed when said impelling means is energized; and operating means operative in accordance with the setting of said impelling means for causing said core and said backing element and also said drive element and the cooperating coupling element to be maintained in a transducing condition when said impelling means is in the transducing setting, and for causing said core and said backing element and also said drive element and the cooperating coupling element to be maintained in a non-transducing condition when said impelling means is in the non-transducing setting said impelling means including a revolvable drive element arranged to engage and drive a portion of said tape along said guide path at a desired transducing speed when said impelling means is in the transducing setting, said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

7. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducible setting in which said impelling means impels said tape in a non-transducible manner; control means for selectively controlling the setting of said impelling means; and operating means responsive to the operation of said control means for causing said core and said backing element to be maintained in a transducing condition when said impelling means is in the transducing setting, and for causing said core and said backing element to be maintained in a non-transducible condition when said impelling means is in the non-transducible setting said impelling means including a revolvable drive element arranged to engage and drive a portion of said tape along said guide path at a desired transducing speed when said impelling means is in the transducing setting, said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

8. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducible setting in which said impelling means impels said tape in a non-transducible manner; said impelling means including a revolvable drive element arranged to selectively operate either in a non-transducing condition in which said drive element does not impel said tape or in a transducing condition in which said drive element impels said tape in a transducing manner when said impelling means is energized; control means for selectively controlling the setting of said impelling means; and operating means responsive to the operation of said control means for causing said magnetic core and said backing element and also said drive element to be maintained in a transducing condition when said impelling means is in the transducing setting, and for causing said core and said backing element and also said drive element to be maintained in a non-transducing condition when said impelling means is in the non-transducing setting.

9. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; control means for selectively controlling the setting of said impelling means; and operating means responsive to operation of said control means for causing said core and said backing element to be maintained in a transducing condition when said impelling means is in the transducing setting, and for causing said core and said backing element to be maintained in a non-transducible condition when said impelling means is in the non-transducing setting said impelling means including a revolvable drive element arranged to engage and drive a portion of said tape along said guide path at a desired transducing speed when said impelling means is in the transducing setting, said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

10. In a magnetic record transducing apparatus for transducing magnetic records on successive elements of a moving tape having a relatively wide permanently magnetizable record surface on one operative side and an opposite side of the same width, the combination comprising: guide means including two reels for storing the tape and arranged to guide said tape between said reels along an elongated guide path with the operative side facing in one direction and the other side facing in an opposite direction; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; said impelling means including a revolvable drive element arranged to selectively operate either in a non-transducing condition in which said drive element does not impel said tape or in a transducing condition in which said drive element impels said tape in a transducing manner when said impelling means is energized; control means for selectively controlling the setting of said impelling means; and operating means responsive to the operation of said control means for causing said magnetic core and said backing element and also said drive element to be maintained in a transducing condition when said impelling means is in the transducing setting, and for causing said core and said backing element and also said drive element to be maintained in a non-transducing condition when said impelling means is in the non-transducing setting.

11. In a magnetic record transducing apparatus for transducing magnetic records on successive elements of a moving tape having a relatively wide permanently magnetizable record surface on one operative side and an opposite side of the same width, the combination comprising: guide means arranged to guide said tape along an elongated guide path; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape in a transducing manner, or in a non-transducible setting in which said impelling means impels said tape in a non-transducing manner; said impelling means including a revolvable drive element and a cooperating coupling element mounted for relative movement between a non-transducing condition in which they are separated by an open space for receiving therebetween another portion of the tape along said guide path, and a transducing condition in which said drive element and said coupling element drivingly engage the opposite sides of another portion of the tape along said guide path for imparting to the tape impelling forces which impel the tape at said transducing speed when said impelling means is energized; control means for selectively controlling the setting of said impelling means; and operating means responsive to the operation of said control means for causing said core and said backing element and also said drive element and the cooperating coupling element to be maintained in a transducing condition when said impelling means is in the transducing setting, and for causing said core and said backing element and also said drive element and the cooperating coupling element to be maintained in a non-transducing condition when said impelling means is in the non-transducing setting.

12. In a magnetic record transducing apparatus for transducing magnetic records on successive elements of a moving tape having a relatively wide permanently magnetizable record surface on one operative side and an opposite side of the same width, the combination comprising: guide means including two reels for storing the tape and arranged to guide said tape between said reels along an elongated guide path with the operative side facing in one direction and the other side facing in an opposite direction; a magnetic record transducing head comprising a magnetic core provided with an outwardly exposed magnetic-pole core face with said core extending substantially entirely along one side of said core face; a backing element having a backing face for cooperation with said core face; said core and said backing element being mounted for relative movement between a non-transducing condition in which said core face is separated from said backing face for receiving therebetween said tape, and a transducing condition in which said core face and said backing face are biased to contact the opposite sides of one portion of the tape along said guide path for pressing the operative side of the tape into stable magnetic engagement with said core face; said guide means including power-energizable impelling means selectively settable either in a transducing setting in which the impelling means impels said tape at a desired low transducing speed in a transducing manner, or at a higher non-transducing speed in a non-transducing setting in which said impelling means impels said tape in a non-transducing manner; said impelling means including a revolvable drive element and a cooperating coupling element mounted for relative movement between a non-transducing condition in which they are separated by an open space for receiving therebetween another portion of the tape placed along said guide path, and a transducing condition in which said drive element and said coupling element drivingly engage the opposite sides of another portion of the tape along said guide path for imparting to the tape impelling forces which impel the tape at said transducing speed when said impelling means is energized; control means for selectively controlling the setting of said impelling means; and operating means responsive to the operation of said control means for causing said core and said backing element and also said drive element and the cooperating coupling element to be maintained in a transducing condition when said impelling means is in the transducing setting, and for causing said core and said backing element and also said drive element and the cooperating coupling element to be maintained in a non-transducing condition when said impelling means is in the non-transducing setting.

13. A recording apparatus as defined by claim 2, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

14. A recording apparatus as defined by claim 4, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

15. A recording apparatus as defined by claim 5, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

16. A recording apparatus as defined by claim 6, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

17. A recording apparatus as defined by claim 8, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

18. A recording apparatus as defined by claim 10, including a cover structure overlying the level of said guide path and having channel-like opening portions generally corresponding to the guide path, in which said tape may be threaded along said guide path, portions of said cover overlying said core and said back element so that the opening portions of the cover structure provide access for placing a portion of the tape between the core face and the backing face when they are in the non-transducing condition.

19. A recording apparatus as defined by claim 11, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

20. A recording apparatus as defined by claim 12, including a cover structure overlying the level of said guide path and having channel-like opening portions generally corresponding to the guide path, in which said tape may be threaded along said guide path, portions of said cover overlying said core and said backing element so that the opening portions of the cover structure provide access for placing a portion of the tape between the core face and the backing face when they are in the non-transducing condition.

21. A recording apparatus as defined by claim 2, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

22. A recording apparatus as defined by claim 4, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

23. A recording apparatus as defined by claim 5, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

24. A recording apparatus as defined by claim 6, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

25. A recording apparatus as defined by claim 8, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

26. A recording apparatus as defined by claim 10, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

27. A recording apparatus as defined by claim 11, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

28. A recording apparatus as defined by claim 12, including a cover structure overlying the level of said guide path and having channel-like opening portions generally corresponding to the guide path, portions of said cover overlying the core and the cooperating backing element and also the driving element so that the opening portions of said cover structure provide space through which the tape may be placed along portions of the guide path at which it is operatively engaged by the core face and the driving element in transducing condition.

29. In a magnetic record transducing apparatus for transducing magnetic records on successive elements of a moving tape having a relatively wide permanently magnetizable record surface on one operative side, and an opposite side, the combination comprising: guide means including two reels for storing the major portion of said tape in coiled form, and impelling means arranged to guide said tape along an elongated guide path and to reel said tape from a supply reel onto a take-up reel when said take-up reel is driven by said impelling means; a magnetic record transducing head comprising a magnetic core provided with an outwardly exposed convex magnetic-pole core face with said core extending substantially entirely along one side of said core face; portions of said core extending along said convex pole face constituting two pole portions spaced by a non-magnetic gap for magnetically linking said pole portions to magnetic portions of said tape bridging said gap; and a backing element having a layer of yieldably cushioning material along an exposed backing face of substantial area arranged to be yieldably pressed against the opposite side of extended portions of said tape adjoining both sides of the portion of said tape bridging said gap for flexing a substantial length of the engaged tape portion into intimate contact with said convex pole faces as it is impelled past said gap; said tape being of physically weak material; the portions of said guide means including the supply reel and the elements engaging and connected to the trailing portion of the tape extending from said supply reel to said head exerting on the portions of the tape connected thereto substantially negligible tensioning forces so that said trailing tape portion is subjected to substantially negligible tensioning forces said impelling means including a revolvable drive element positioned adjacent said guide path and arranged to engage and drive a portion of said tape along said guide path past said pole faces when said impelling means is set to drive said tape at a record transducing speed; said impelling means being selectively settable either in a transducing setting in which the impelling means impel said tape in a transducing manner or in a non-transducing setting in which said impelling means impels said tape in a non-transducing manner, said backing element being held separated from said core when said impelling means is in a non-transducing setting; said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

30. A recording apparatus as claimed in claim 29, said impelling means including a revolvable drive element positioned adjacent said guide path and arranged to engage and drive a portion of said tape along said guide path past said pole faces when said impelling means is set to drive said tape at a record transducing speed; said impelling means being selectively settable either in a transducing setting in which the impelling means impel said tape in a transducing manner or in a non-transducing setting in which said impelling means impels said tape in a non-transducing manner, said backing element being held separated from said core when said impelling means is in a non-transducing setting; said guide means including a cover structure overlying the level of said guide path and having channel-like opening portions generally corresponding to the guide path, through which said tape may be threaded along said guide path, portions of said cover overlying said core and said backing element, and also overlying said drive element so that opening portions of said cover structure provide access for placing a portion of said tape between the core face and the backing face when they are in a non-transducing setting, portions of the tape placed through opening portions of said cover along said guide path being arranged to be engaged and driven by said drive element when said impelling means is in a transducing setting.

ALFRED P. DANK.

REFERENCES CITED

The following references are of record in the file of this patent:

UNITED STATES PATENTS

| Number | Name | Date |
|---|---|---|
| 1,836,613 | Oehmichen | Dec. 15, 1931 |
| 1,949,840 | Languepin | Mar. 6, 1934 |
| 2,086,130 | Hickman | July 6, 1937 |
| 2,091,756 | Fodor | Aug. 31, 1937 |
| 2,275,961 | Heller | Mar. 10, 1942 |
| 2,317,199 | Kirschbaum | Apr. 20, 1943 |
| 2,351,003 | Camras et al. | June 13, 1944 |
| 2,351,007 | Camras | June 13, 1944 |
| 2,369,017 | Camras | Feb. 6, 1945 |
| 2,380,392 | Begun | July 31, 1945 |